United States Patent
Schrantz et al.

(10) Patent No.: US 11,165,838 B1
(45) Date of Patent: Nov. 2, 2021

(54) VIDEO CAPTURE AND MANAGEMENT SYSTEM

(71) Applicant: Curator Video, LLC, Cincinnati, OH (US)

(72) Inventors: Mark Schrantz, Loveland, OH (US); Michael Ball, Maineville, OH (US); Gus Valen, Middletown, OH (US)

(73) Assignee: Curator Video, LLC, Loveland, OH (US)

( * ) Notice: Subject to any disclaimer, the term of this patent is extended or adjusted under 35 U.S.C. 154(b) by 0 days.

(21) Appl. No.: 16/563,232

(22) Filed: Sep. 6, 2019

Related U.S. Application Data

(60) Provisional application No. 62/728,166, filed on Sep. 7, 2018.

(51) Int. Cl.
| | |
|---|---|
| *G06F 3/048* | (2013.01) |
| *H04N 5/247* | (2006.01) |
| *H04L 29/06* | (2006.01) |
| *G06F 3/0484* | (2013.01) |
| *G06F 3/0482* | (2013.01) |
| *H04N 5/268* | (2006.01) |
| *H04N 7/01* | (2006.01) |
| *G10L 15/22* | (2006.01) |
| *G11B 27/031* | (2006.01) |
| *G11B 27/34* | (2006.01) |

(Continued)

(52) U.S. Cl.
CPC .......... *H04L 65/403* (2013.01); *G06F 3/0482* (2013.01); *G06F 3/04847* (2013.01); *G10L 15/22* (2013.01); *G10L 15/26* (2013.01); *G11B 27/031* (2013.01); *G11B 27/34* (2013.01); *H04N 5/23203* (2013.01); *H04N 5/247* (2013.01); *H04N 5/268* (2013.01); *H04N 7/0127* (2013.01); *G06F 2203/04803* (2013.01)

(58) Field of Classification Search
CPC . H04L 65/403; G06F 3/0482; G06F 3/04847; G06F 2203/04803; G10L 15/22; G10L 15/26; G11B 27/031; G11B 27/34; H04N 5/23203; H04N 5/247; H04N 5/268; H04N 7/0127

See application file for complete search history.

(56) References Cited

U.S. PATENT DOCUMENTS

| | | | |
|---|---|---|---|
| 10,891,038 B1* | 1/2021 | Toff | G06F 3/0482 |
| 2015/0127340 A1* | 5/2015 | Epshteyn | G09B 5/00 704/235 |

* cited by examiner

*Primary Examiner* — Twyler L Haskins
*Assistant Examiner* — Fayez A Bhuiyan
(74) *Attorney, Agent, or Firm* — Ulmer & Berne LLP

(57) ABSTRACT

A curation system may be used by a number of collaborative users in order to capture and manage audio and video content. Content is captured by a capture device and streamed in near real-time to a storage and management server. The management server is configured to provide interfaces to remote collaborative users via computers and other devices to allow content to be viewed as it is captured, or after it is captured. Collaborative users may also modify content by submitting metadata to be associated with content in order to add comments, keywords, clips, notes, and other organizational and classifying information to sections of the content. The server is also configured to transcribe audio and video content, and associate transcription metadata with the content to allow it to be further captioned, searched, and organized. Shared interfaces allow users to collaboratively edit and publish content while minimizing wasted effort.

20 Claims, 20 Drawing Sheets

(51) Int. Cl.
*H04N 5/232* (2006.01)
*G10L 15/26* (2006.01)

VIDEO CAPTURE AND MANAGEMENT SYSTEM

PRIORITY

This application is a non-provisional filing of U.S. Provisional Patent Application No. 62/728,166, filed Sep. 7, 2018 and titled "Video Capture and Management System," the entirety of which is hereby incorporated by reference.

FIELD

The disclosed technology pertains to a system for capturing and managing video content.

BACKGROUND

In just the past ten years, video capture equipment costs have fallen while video capture quality and usability of equipment has improved. As a result, pocket-sized devices capable of capturing high definition video images have become ubiquitous, with around 75% of the U.S. population having a smart phone capable of capturing video content at 1080p resolutions, and with some consumer grade action cameras capable of capturing video content at 4 k resolutions and at framerates of 90-120 frames per second.

With these improvements in performance and cost, the production and use of video content for even trivial reasons has become viable for businesses and individuals. Every day millions of individuals create videos of pets, family members, hobbies, product reviews, video journals, and other content. Similarly, most business and industries now create video content for marketing purposes, research purposes, internal team and culture building purposes, and other similar purposes. Conventionally, such corporate video productions would typically be high cost projects, involving videographers, designers, script writers, and other resources, often engaged as third-party consultants, all working in isolation to produce various portions of a project that is then edited together. This can be a time consuming process, and is often performed on strict timelines and without any significant level of coordination or collaboration beyond that timeline.

For example, one company may perform market research for their customers that involves observing end-users as they interact with and answer questions about products and services offered by that customer. Such research may be performed using standard video equipment such as a digital camcorder. Before this video content can be prepared and provided to the customer as usable marketing insights, the content must be physically transferred from the camera to a first computer system, and then transferred to an internet connected computer network for storage and manipulation. This process takes significant time, and is prone to video content being corrupted, lost, or misplaced before it is safely received and stored.

Once available on the network, those responsible for preparing the video content for the customer may be notified of its availability by email or phone, and then must access the content in order to start editing, transcribing, or producing various marketing insights from the content. These roles may each operate in isolation and without adequate visibility of the greater project, which can lead to unnecessary delays (e.g., a transcriber being unaware that content is currently available to transcribe due to a missed phone call), wasted effort (e.g., transcribing a section of an interview that is later cut), or loss of important data (e.g., a section of an interview may be cut by an editor because it contains no speech, but may contain valuable insights in terms of body language, facial expression, etc.)

What is needed, therefore, is an improved system for collaboratively capturing and managing video content.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of capturing and collaboratively managing video content. While the disclosed applications of the inventors' technology satisfy a long-felt but unmet need in the art of capturing and collaboratively managing video content, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

The technology disclosed herein may be implemented to provide streamlined and simplified systems, tools, and interfaces allowing for the collaborative capture, review, management, and distribution of content such as video content. Systems implemented with one or more aspects of the technology disclosed herein may be used for a variety of purposes (e.g., personal uses such as collaborative video blogging, or commercial uses such as video capture and production of market research, job interviews, legal interviews,) and across any applicable industry. For the sake of clarity, discussion and examples described herein may focus on certain uses or industries (e.g., video interviews of users of products or services to produce market research), but such a focus should not be interpreted as limiting the implementations, applications, uses, industries, or potential users of the disclosed technology in any way.

As applied to video interviews for market research (or other uses, as described above), some implementations of the disclosed technology provide an end-to-end solution for capturing video content during an interview, automatically transmitting captured content to a storage server, providing collaboration tools to remote collaborators during capture, providing management tools to remote collaborators after capture, and providing publishing and distribution tools for use by remote collaborators on finalized content.

Some implementations of the disclosed technology advantageously mitigate inefficiencies and risks associated with physically transporting captured content (e.g., transporting a memory card from an interview site to an internet connected computer for upload to a remote server), scheduling and managing post-processing of content (e.g., version control of video content, assigning sequentially performed tasks by multiple parties on the same content), distribution of content (e.g., time delays between capture of video and availability for remote resources to review content), and other areas of improvement.

I. Exemplary System and Methods for Curation

Figure 1:
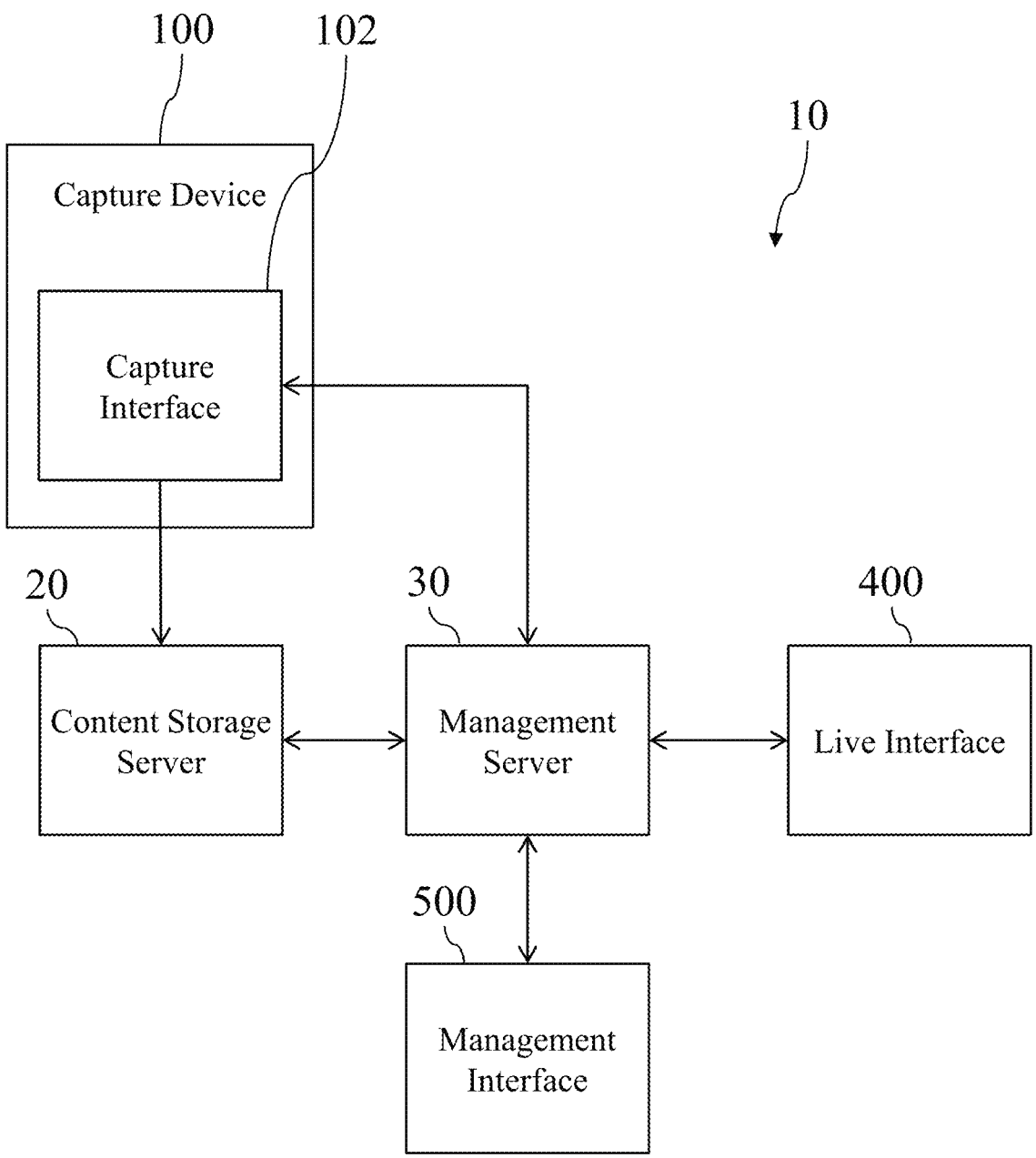
FIG. 1 is a system architecture of an exemplary curation system configured to allow the capture and management of video and other content.

Turning now to the figures, FIG. 1 shows a system architecture of an exemplary curation system (10) configured to allow the capture and management of video and other content. The curation system (10) comprises a capture device (100) configured to provide a capture interface (102) to users, a content storage server (20) in communication with the capture device (100) and configured to receive and store data from the capture device (100), and a management server (30) in communication with the capture device (100) and the content storage server (20), and configured to provide a live interface (400) and a management interface (500) to remote users of the system.

Figure 2:
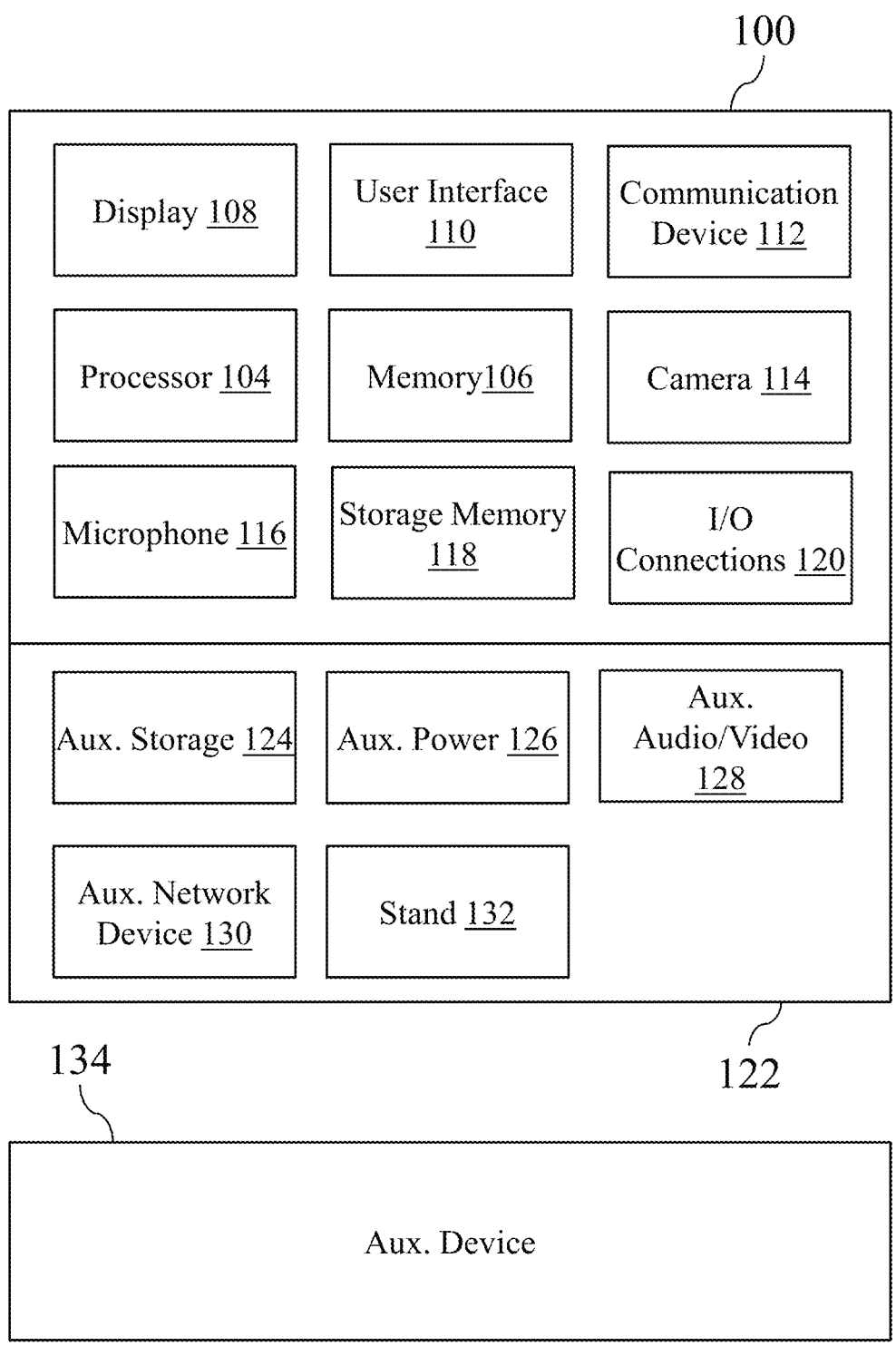
FIG. 2 is a schematic diagram of an exemplary capture device of the curation system.
Figure 3:
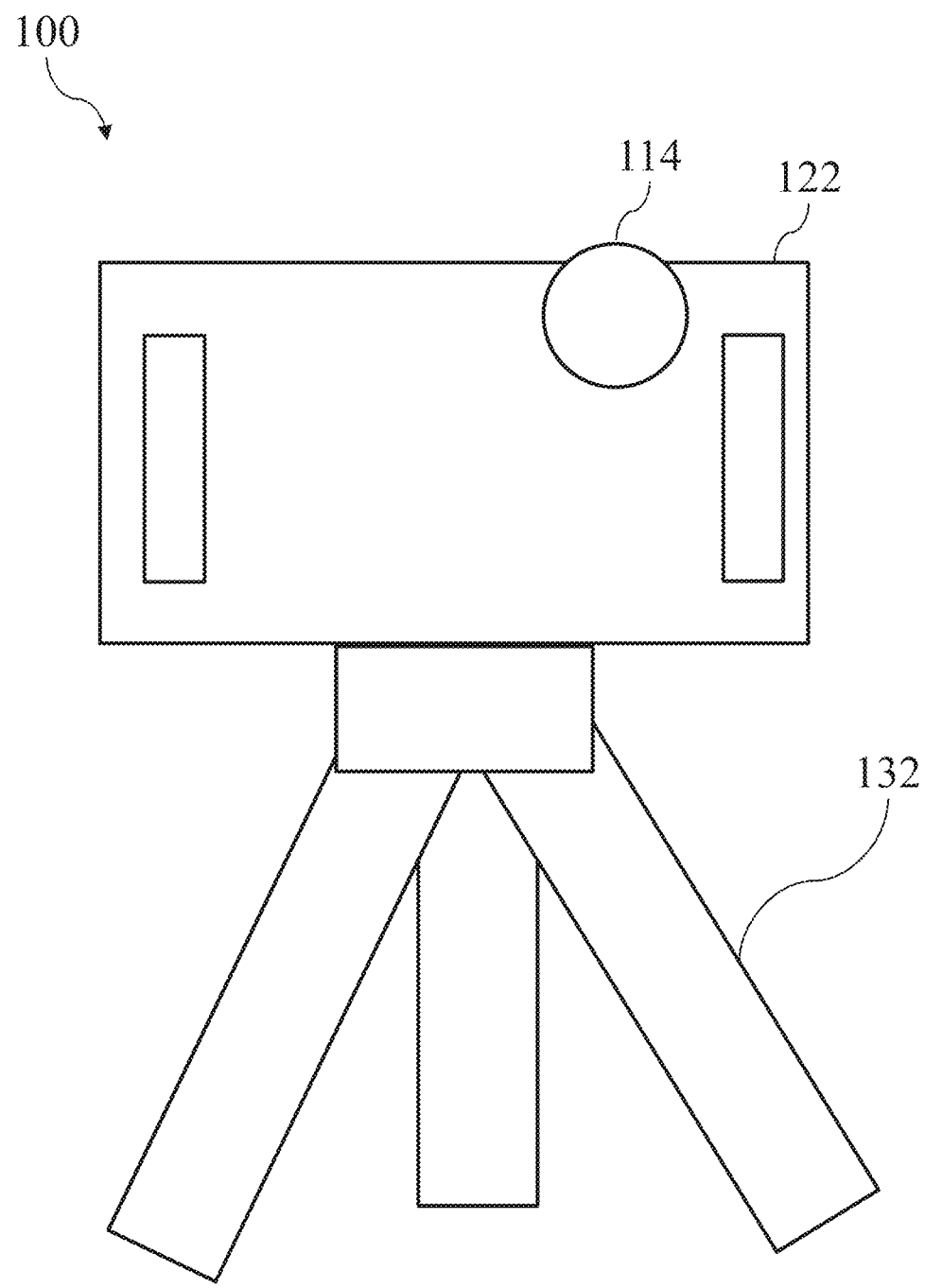
FIG. 3 is a schematic diagram simulating a front elevation view of the capture device.

The capture device (100), which is shown in detail in FIGS. 2 and 3, is usable by a user to capture content such as audio and video in a variety of forms (e.g., varying resolutions, framerates, and bitrates, 2D video, 3D video, 180-degree VR video, 360-degree VR video, mono sound, stereo sound, binaural sound, and other formats), and communicate the captured content to the content storage (20). The capture device (100) may be one or more of, for example, a laptop computer with an integrated or attached video capture device, a mobile device such as a smart phone or tablet, a proprietary device having features and capabilities similar to any of the above, or another computing device having appropriate capabilities, as may be desired for a particular implementation. In some implementations, the capture device (100) may be an off the shelf consumer device having appropriate features (e.g., a camera, communication device, interface, as will be further described in relation to FIG. 2) and configured to provide the capture interface (102) to a user (i.e., by installing the capture interface (102) on the device) and communicate the content storage server (20) (i.e., by activating a wireless data service or connecting to a wireless network).

The capture interface (102) may be a software application interface allowing a user of the capture device (100) to configure, start, and end content capture sessions, to view captured content, and to otherwise interact with the curation system (10) via a keyboard, touchscreen, or other user interface of the capture device (100). The capture interface (102) may be stored on the capture device (100) as a set of programming instructions and data usable by the capture device (100) to render and provide the capture interface (102), and may be the primary software application (e.g., in a proprietary device) or may be a software application installed and run on a pre-existing operating system (e.g., an application installed on a tablet and run by an operating system of that tablet). In some implementations, the capture device (102) may be a combination of several devices, such as a first device that includes the communication device (112) and a second device that includes the camera (114). In such an implementation, the capture device (102) may communicate with a variety of a cameras, such that any connected camera may provide video, audio, and images to the first device, while the first devices provides communication with other devices of the system (10) and other features related to the management and curation of content, as will be described in more detail below.

The content storage server (20) may be one or more physical, virtual, or cloud storage devices configured to store and associate content with other data, such as a cloud storage repository configured to store content and a relational database configured to associate various information with content in the repository. This could include, for example, associating video content with a capture time, a capture source, a user associated with the content, a project associated with the content, a company associated with the content, a description of the content, and other similar information. The management server (30) may be one or more physical, virtual, or cloud computing systems configured to, for example, communicate with other devices of the curation system (10), provide the live interface (400) and management interface (500) to users (e.g., via a website, API, or other application or interface), receive inputs from users of the curation system (10), and perform actions in response to inputs from users of the curation system (10). As a result of user interactions with the management server (30) or based upon other processes, the management server (30) may cause content from the content storage server (20) to be displayed to one or more users and modified in various ways (e.g., cropped, deleted, shortened, captioned).

The live interface (400) may be configured to allow one or more remote users to collaboratively view, modify, and discuss content while the content capturing session is ongoing, and as content is still being captured by the capture device (100) and streamed to the content storage server (20). Features of the live interface (400) available to remote users may include, for example, viewing the content, listening to audio from the content, commenting, marking, or annotating the content, and other features as will be described in greater detail below.

The management interface (500) may be configured to allow one or more remote users to collaboratively view, modify, and publish content after a content capturing session has completed and the content is fully available on the content storage server (20). Features of the management interface (500) may include, for example, viewing the content, listening to audio from the content, marking or annotating the content, navigation to various moments of time within the content, translating and transcribing the content, and other features as will be described in greater detail below. Each of the live interface (400) and the management interface (500) may also be referred to herein as a collaboration interface.

As will be apparent to one of ordinary skill in the art in light of this disclosure, numerous variations on the curation system (10) are possible. For example, management server (30) and content storage server (20) may be configured and hosted on the same devices or devices, live interface (400) and management interface (500) may be available via the same website, application, or other common interface, and curation system (10) may also be implemented as an entirely offline solution for localized use in a building or facility.

Turning now to FIG. 2, that figure shows a schematic diagram of an exemplary capture device (100) of the curation system (10), while FIG. 3 shows schematic diagram that simulates a front elevation view of the capture device. As has been discussed, the capture device (100) may be a smartphone, tablet, laptop, proprietary device, or other device having similar capabilities. For the sake of clarity, discussion of the capture device (100) in relation to FIGS. 2 and 3 will focus on capture device (100) being implemented as a modified smart tablet device, though such discussion will be non-limiting and will apply to a variety of other devices.

The capture device (100) comprises a processor (104) and memory (106) that may be configured with instructions to control various other components, features, or aspects of the capture device (100), and to provide various software interfaces, applications, and user interfaces via a display (108), and receive various types of user input via a user interface (110) (e.g., a touch-screen keyboard integrated with the display (108), an external keyboard or mouse) or other device.

A communication device (112) may be one or more of a Bluetooth transceiver, Wi-Fi transceiver, cellular data transceiver, or other wireless communication device capable of exchanging information with remote or nearby devices. A camera (114) may be positioned on the exterior of the capture device (100), and may be capable of capturing photographs and video at various resolutions and framerates, while a microphone (116) may be capable of capturing audio during or independently of video capture by the camera (114). A storage memory (118) may be a solid-state storage drive configured to store images, audio, video, software applications, software configurations, and other data that is captured by the camera (114) or the microphone (116), or that is otherwise written to the storage memory (118) by the processor (104). A set of I/O connections (120) may be positioned about the exterior of the capture device (100), and may include, for example, a power connector, a universal serial bus connector, or a proprietary connector capable of receiving data, power, or both.

In some implementations, the capture device (100) may also comprise a case (122) that holds the capture device (100) and provides one or more of protection (e.g., against drops, water, or other environmental hazards), usability (e.g., handgrips to aid in carrying, positioning, or aiming the camera (114)), or other features. For example, while a number of different auxiliary or external devices could be attached to the capture device (100) wirelessly or otherwise, it may be advantageous to provide the case (122) with such external devices mounted on the exterior or integrated within, both for reasons of aesthetics, and to minimize the number of devices, cabling, etc., that must be arranged and connected when using the capture device (100). For example, the case (122) may integrate one or more devices usable with the capture device (100) such as an auxiliary storage (124), an auxiliary power source (126), auxiliary audio-video ("AV") devices (128), auxiliary communication devices (130), and a stand (132).

One or more of the auxiliary storage (124), the auxiliary power (126), or the auxiliary network device (130) may be integrated within a protected area of the case (122) and positioned to connect with the I/O connections (120) when the capture device (100) is placed in the case (122), in order to provide additional storage capabilities, provide improved battery life when an external power source is not available, or to provide an additional connection to local or remote communication networks (e.g., an auxiliary mobile cellular data connection could be used to provide backup connectivity, or to supplement primary data connectivity and increase overall communication speed). Similarly, the auxiliary AV devices may be positioned on the exterior of the case (122) and be connectable via the I/O connections (120) to provide various additional capabilities (e.g., multiple microphones or focused microphones to capture sound from specific areas, multiple cameras to capture stereoscopic or 3D video or multiple perspectives). The stand (132) may be for example a tripod or other mounting stand, and may be attached to the case (122) to hold it stable during use at various heights, mount the capture device (100) to surfaces such as walls or ceilings, or other uses that will be apparent to one of ordinary skill in the art in light of this disclosure.

Some implementations of the capture device (100) may also comprise an auxiliary device (134) that functions with the capture device (100) to provide additional capabilities to a user. The auxiliary device (134) may be, for example, a wirelessly connected wearable device, smartphone, or input device. In some implementations, the auxiliary device (134) may be a smartwatch worn by an interviewer and interfacing with the capture device (100) such that inputs to the smartwatch are received by the capture device (100) via Bluetooth or other short range wireless communication, which could, for example, start or stop video capture, mark a point in video for further review, or change configurations or other aspects of the capture device (100). Similar features could also be implemented on a smart phone (e.g., connected via Bluetooth or connected through the management server (30)) or another commercially available or proprietary input device (e.g., a handheld fob or other device with buttons that may be interacted with to mark video, start video capture, etc.).

Figure 4:
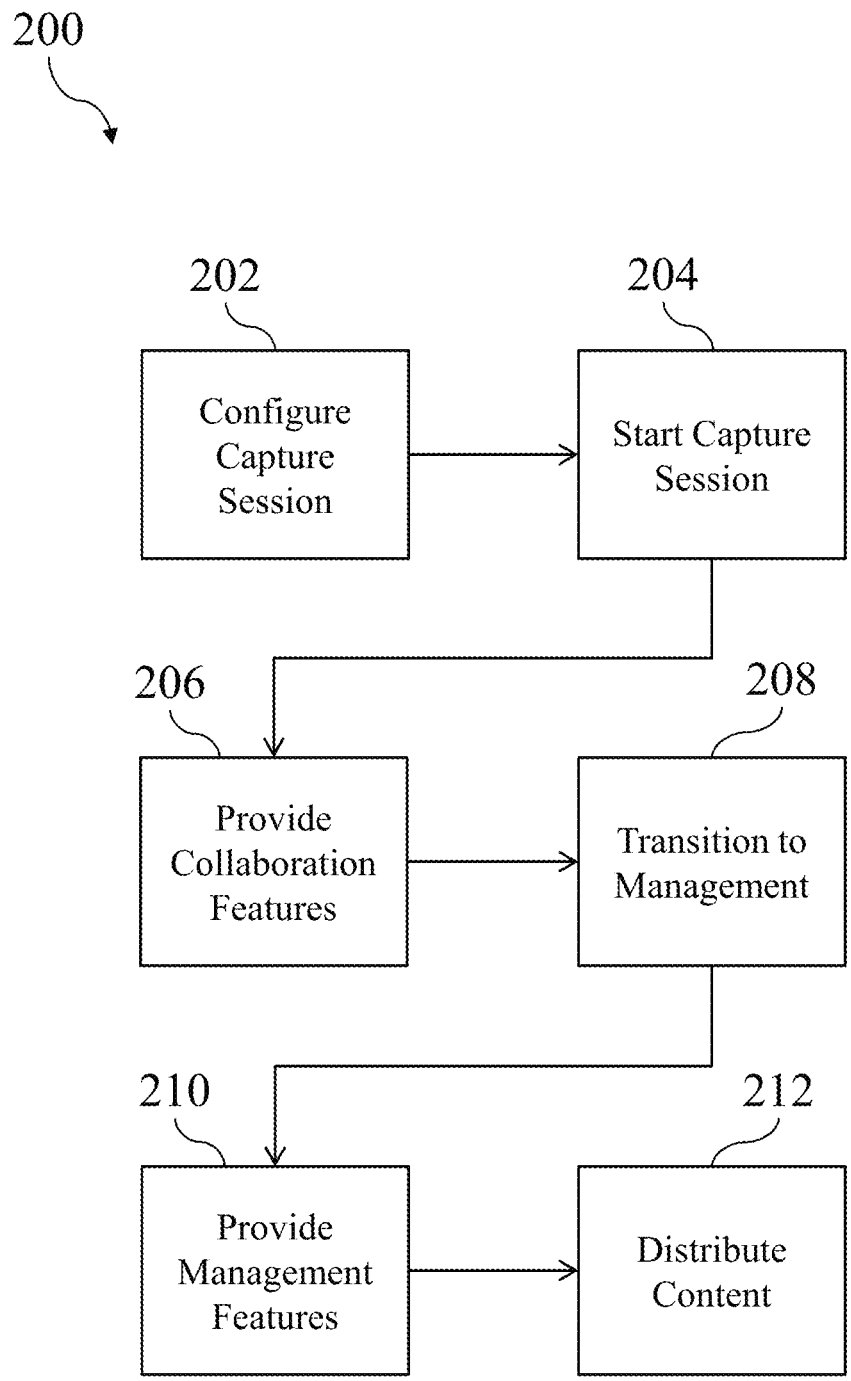
FIG. 4 is a flowchart of an exemplary set of high-level steps that could be performed with the curation system to capture, collaborate, manage, and distribute content.

Having discussed the curation system (10) and capture device (100) in some detail, as well as their various uses at a high level, FIGS. 4-10 show various methods that may be performed by or with one or more devices or interfaces of the curation system (10). FIG. 4 shows a flowchart of an exemplary set of high-level steps that could be performed with the curation system (10) to capture, collaborate, manage, and distribute content (200). Initially, a capture session may be configured (block 202) which could include configuring the capture device (100) to capture content associated with a project, and configuring the management server (30) to manage content associated with that project. The capture session may then be started (block 204) by interacting with the capture device (100) to cause it to begin capturing content. This could include activating the camera (114) of the capture device (100) in order to capture video and audio of an interview with a user of a product or service. Captured content may be stored locally to the capture device (100), transmitted to the management server (30), or both, as will be described in further detail below.

After content capture is started (block 204), the curation system (10) may provide (block 206) a variety of collaboration features to users via the live interface (400) to allow those users to collaboratively participate in the session, as content is captured, in order to view, discuss, and guide the interview as it is ongoing, and to begin to organize and modify the content resulting from the interview, in addition to other activities. Once the capture session ends, the curation system (10) may transition (block 208) from providing (block 206) the collaboration features to instead providing (block 210) management features via the management interface (500). Management features could include, for example, tools for viewing, modifying, classifying, organizing, editing, annotating, and discussing content.

Transitioning (block 208) from providing (block 206) the collaborative features to providing (block 210) the management features may include making changes to data stored in the content storage server (20), the management server (30), or both to update the current status of the project (e.g., pre-project, session started, session ended, post-project), update users that are authorized to view and work on the project (e.g., in some cases users may be able to use the live interface (400) but not the management interface (500)), create backup copies of content, notify users associated with a project of the project's status (e.g., notifying a manager that a scheduled interview just completed), and other actions.

After providing (block 210) the management features and allowing users to manage the content as needed, the curation system (10) may also be used to distribute (block 212) content that has been produced based upon content captured during sessions and collaborative curation by one or more users. Distribution (block 212) may include producing new edited video content and distributing such new content via downloaded copies, download links, social media, email, or other distribution channels.

Figure 5:
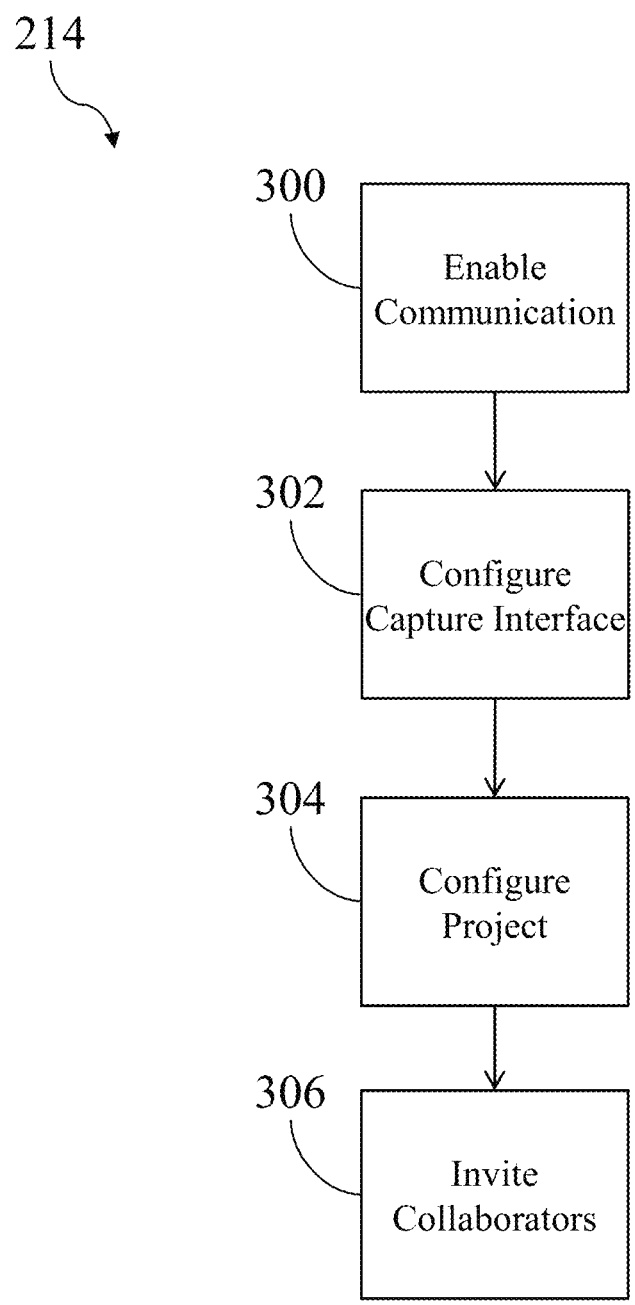
FIG. 5 is a flowchart of an exemplary set of steps that the curation system could perform to configure the capture device for use.

Turning now to FIG. 5, that figure shows a flowchart of an exemplary set of steps that could be performed by or with the curation system (10) to configure the capture device (100) for use (214). The capture device (100) and curation system (10) may be configured to enable (block 300) communication to allow for captured content to be streamed from the capture device (100) to the content storage server (20), and to allow the capture device (100) to exchange information with the management server (30) related to projects, sessions, and content so that captured content is associated with the correct projects and users. In some implementations, this may include configuring the capture device (100) so that the communication device (112), auxiliary communication device (130), or both can communicate with a cellular data network or an internet connected local Wi-Fi network that will be available at the project site. Configuring the capture device (100) for cellular data communication may advantageously reduce the complexity of configuring the capture device (100) for use at the project site.

The capture interface (102) may also be configured (block 302) on the capture device (100). This may include, for example, installing software such as a mobile application on the capture device (100), configuring the capture device (100) to load the capture interface (102) automatically, or disabling other interfaces of the capture device (100) in order to make it usable exclusively with the capture interface (102). Installing the capture interface (102) may be accomplished by, for example, connecting the capture device (100) to a storage device containing the application, downloading the application from a website or electronic communication, or using an application management platform to remotely install the application to the capture device (100).

A particular project may also be configured (304) and associated with the capture device (100). This may be performed by, for example, configuring the capture interface (102) for a particular project or customer before it is provided to the customer, or by configuring the capture interface (102) to authenticate users by accepting a username and password or other identifying information upon use. After identifying a user, the capture device (100) may identify one or more projects associated with the user based upon project records stored in the content storage server (20) or management server (30), and present the available projects to the user for selection of the desired project to the user. As a result of configuring (304) the project, all content produced by the capture device (100) will be uniquely associated with that project, and access to the content (via the live interface (400) or management interface (500)) will be restricted to users associated with that project.

While only exemplary of the manner in which particular uses of the curation system (10) may be organized, a project may be thought of as a high-level container describing a particular intention or result. For example, in a marketing research industry, a project description may be "User sentiment for laundry detergent X". The project may have an associated customer (e.g., a business Y that produces laundry detergent X), a number of authorized users (e.g., employees of business Y that are responsible for researching user sentiment of X), and a number of sessions (e.g., captured content from individual interviews or observations of users of X).

In some implementations, particular projects may also be associated with content limits (e.g., limiting content that is streamed to the content storage server (20) to a certain length or size), connectivity limits (e.g., limiting the use of cellular data connections), geographical limits (e.g., preventing use of the capture device (100) outside of a geofenced area as determined by a positioning sensor or device of the capture device (100)), or time limits (e.g., restricting use of the capture device (100) outside of particulate dates or times).

Collaborators may also be automatically invited (block 306) to participate in a particular configured (block 304) project. This may include sending an electronic communication to a collaborator via email, text messaging, software application, or other channels notifying them that a project has been created and associated with them as a collaborator. Such a communication may contain information on the project and instructions, software applications, electronic links, or other information that may be used to collaborate on the project using the curation system (10). When the project is configured (block 304), a list of email addresses may be provided by an administrator or customer that may be used to authorize collaborators for the project (e.g., through a username and password or other challenge), and may also be used to invite (block 306) them.

Figure 6:
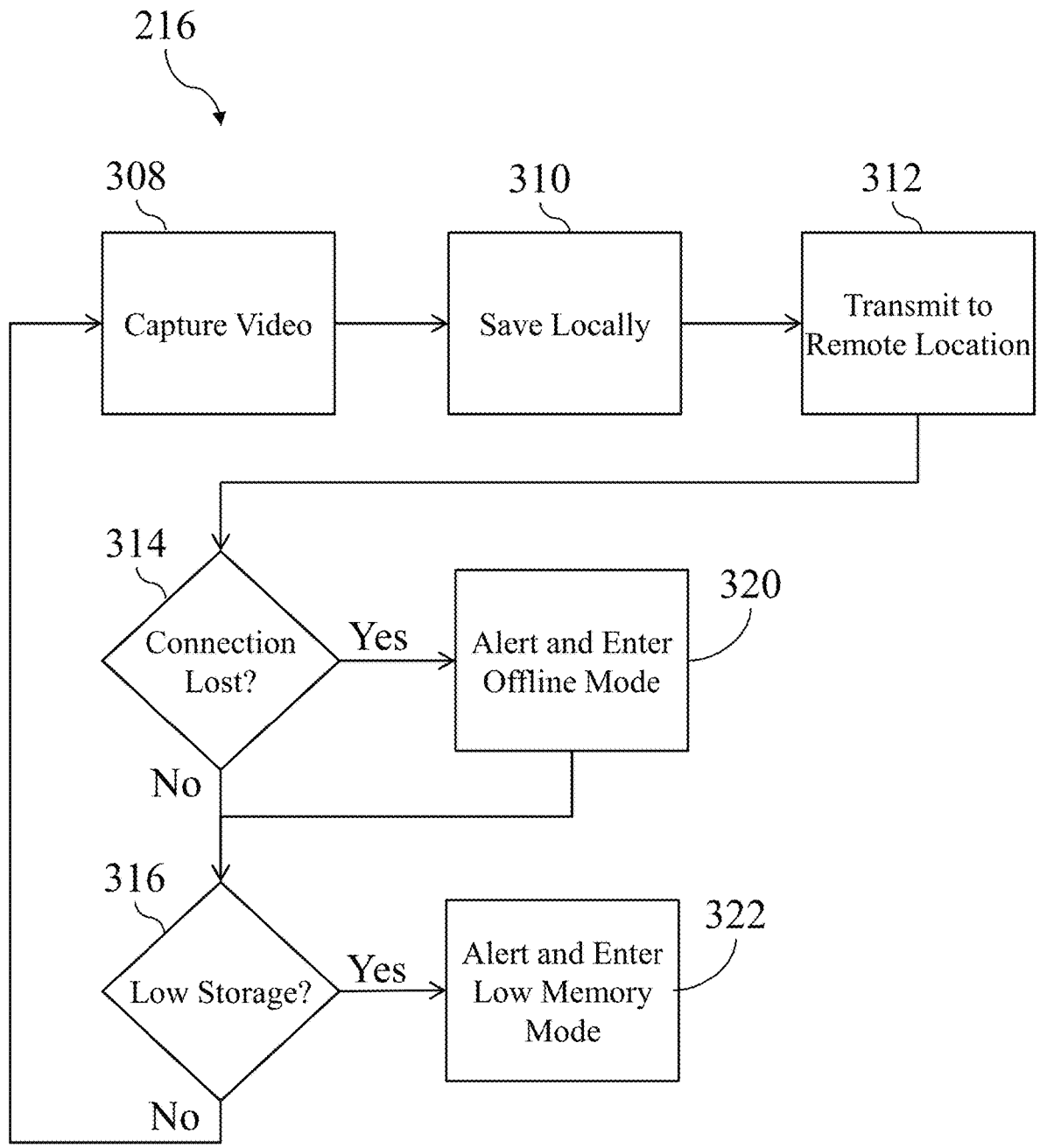
FIG. 6 is a flowchart of an exemplary set of steps that the curation system could perform to capture content during use.

With the curation system (10) and capture device (100) configured and ready for use, capturing content for a particular project during one or more content capture sessions may begin. FIG. 6 shows a flowchart of an exemplary set of steps that the curation system (100) could perform to capture content during such a session (216). During a capture session such as an interview of a user of a product, the capture device (100) may capture (308) video, audio, or other content via the camera (114), the microphone (116), or the auxiliary AV device (128), for example. Such content may be saved (block 310) locally to the storage memory (118), and may also be transmitted (block 312) to a remote location such as the content storage server (20) in near real-time via the communication device (112) or other connection. This may continue until the capture session is ended by a user of the capture device (100), such as when the interview or interviews for a particular session have been completed.

During a capture session such as described above, if the capture device (100) determines that the connection to the content server (20) is lost (block 314) for any reason (e.g., connection to local wireless network lost, connection to cellular network lost, connection speed insufficient), the capture device (100) may provide an alert and enter an offline mode (block 320) in order to minimize the risk of lost content. An alert may be provided to a user of the capture device via the capture interface (102), and may include a visual or audible alert (e.g., flashing the display (108), flashing a light or visible indicator of the capture device (100), emitting a tone from a speaker of the capture device), a haptic alert delivered via a wearable device configured as the auxiliary device (134), or an electronic communication transmitted to the user via another device such as a smartphone.

When in offline mode, the capture device (102) may be configured to perform one or more actions that are protective of captured content, since without a connection to the content storage server (20) there is a possibility of content being lost in the event of equipment failure of the storage memory (118), or low storage availability of the storage memory (118). This may include, for example, switching to the auxiliary communication device (130), automatically reducing the resolution or framerate of captured video in order to reduce demands on the storage memory (118), or forcing the capture device (100) into an overwrite mode content will be written to the storage memory (118) until capacity is reached and then new content will begin to overwrite previously locally saved content that has already been transmitted to the content storage server (20).

Similarly, when the capture device (100) begins to run low on storage (block 316), the capture device (100) may provide an alert (e.g., audibly, visually, electronically as described above) to a user and enter a low memory mode (block 322). As with offline mode (block 320), low memory mode (block 322) may cause the capture device (100) to take one or more actions to preserve captured content and reduce the risk of lost content. This may include, for example, reducing the need for space on the storage memory (118) by halting the process of saving (block 310) the content locally so long as the capture device is not in offline mode (block 320), or deleting locally saved (block 310) content that has already been transmitted to the content storage server (20). This may also include switching to the auxiliary storage device (124), reducing the quality or framerate of content saved locally, only saving audio content locally and discarding video content, and other similar changes that may reduce the need for local storage.

Some actions taken by the capture device (100) when in low memory mode (block 322) may be more sophisticated, and may include choosing to save content locally on the storage memory (118) or discard it based upon collaborative user input. For example, as has been described, collaborative users may view the capture session as it occurs via the live interface (400) in order to discuss the content, and mark sections as being particularly relevant, or associated with certain keywords or other important concepts. When in low memory mode (block 322), the capture device (100) may prioritize sections of content for local saving (block 310) or transmission (block 312) when user collaboration and interaction on those sections indicates that they are particularly relevant or valuable.

For example, during the course of a 20-minute interview, a first 5 minute segment might be discussions of weather or a recent holiday, a second 5 minute segment discussion of product X, a third 5 minute segment complaints about unrelated product Z, and a final 5 minute segment discussion of product X's primary competitor. Live collaborators may, during capture of such a session's content, view the content via the live interface (400) and mark the first segment as irrelevant, the second segment with the keyword "Product X", the third segment as irrelevant, and the final segment as "Competitor". When in low memory mode (block 322), the capture device (100) may delete or discard the first and third segment, may delete or discard any other segment that has already been transmitted (block 312) to the content storage server (20), and may prioritize the second and final segments for local saving (block 310) and transmission (block 312) to the content storage server (20). Other actions taken by the capture device (100) during offline mode (block 320) and low memory mode (block 322) will be apparent to one of ordinary skill in the art in light of the teachings herein.

Figure 7:
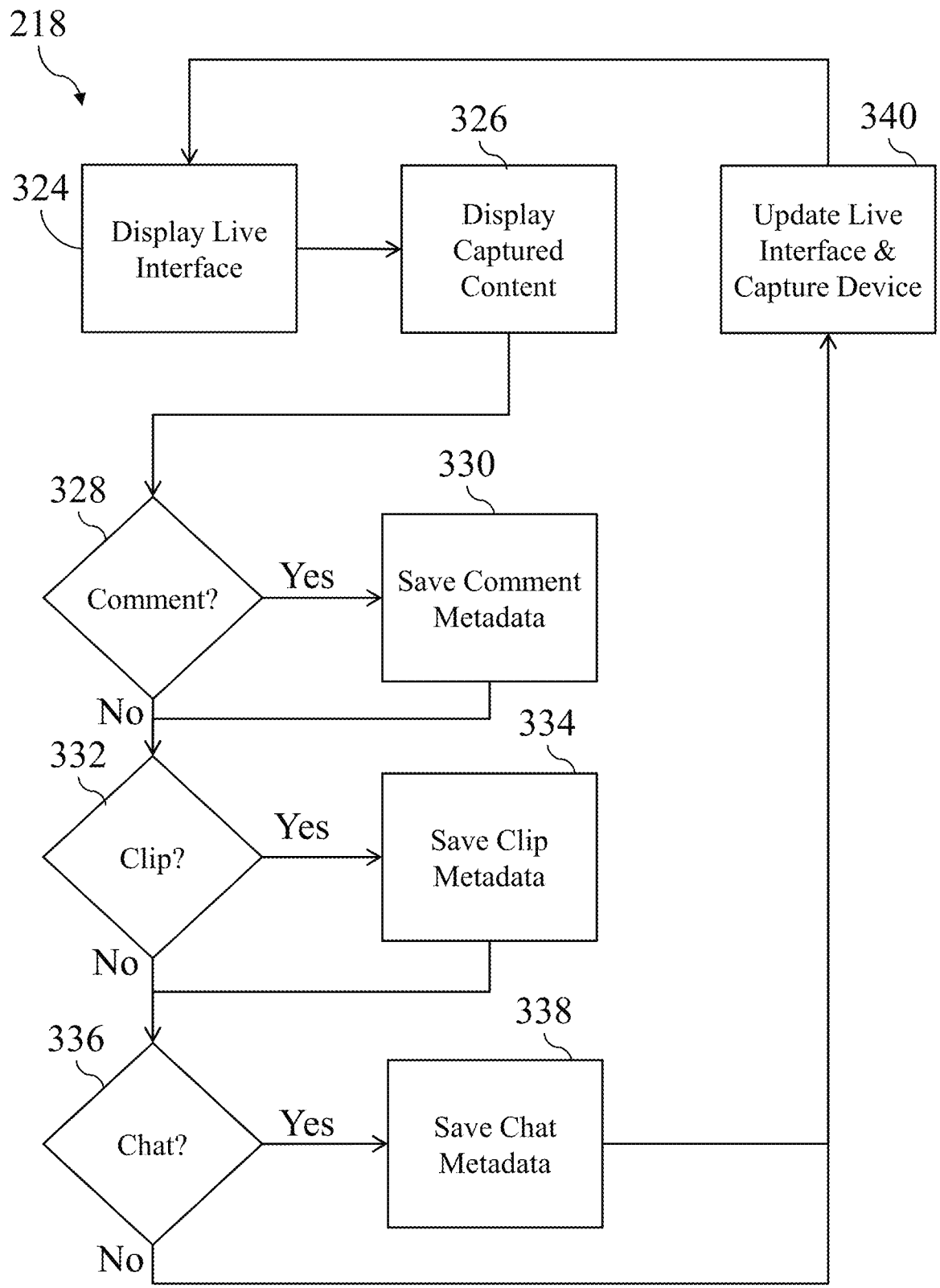
FIG. 7 is a flowchart of an exemplary set of steps that the curation system could perform to provide live collaboration during content capture.

Turning now to FIG. 7, that figure shows a flowchart of an exemplary set of steps that the curation system (10) could perform to provide live collaboration features during content capture (218). In some implementations, the set of steps may be performed by the management server (30) in order to provide the live collaboration features to one or more collaborating users via the live interface (400). During the capture session, the live interface (400) may be displayed (block 324) to one or more users that are connecting to the live interface (400) via a software application, web browser, or other interface. The live interface (400) may have a number of user controls and interface options, and may also have a section that displays (block 326) content that has recently been, or is currently being, captured by the capture device (100). As users of the live interface (400) provide user inputs via the user controls, the management server (30) will perform various actions based upon the user inputs.

For example, some implementations of the live interface (400) will allow collaborating users to add a comment to a particular piece of content as it is viewed. This could include, associating a keyword or phrase with a particular section or range of content, or with a particular moment of time in the content. As an example, if a collaborating user is viewing content that is being displayed (block 326) via the live interface (400) from a product user interview, the collaborating user may here an interesting complaint about the product at the five-minute mark of the interview. The collaborating user may submit a comment such as "Complaint? Follow up." to be associated with a time or range of time near the five-minute mark. When a comment is received (block 328), the management server (30) will create and save (block 330) metadata describing the comment, and associating the comment with the captured content. Such metadata may be saved to the content storage server (20), the management server (30), or both as may be desired.

When a user input is received via the live interface (400) indicating a range of time within content that a collaborating user would like to designate as a clip (block 332), the management server will create and save (block 334) metadata describing the clip, and associate the clip metadata with the captured content. This may be useful where a collaborating user doesn't have a particular keyword or phrase to describe that section of content, but would like to indicate that the subject has changed, or that it is in some way different from the surrounding sections of content. In some implementations, clip metadata (block 334) may be used by the management server (30) to create a new set of video data (e.g., a distinct file containing only the content within the clip range), while in others the content will not be explicitly reproduced, but will instead be associated with the metadata so that such reproduction may occur in the future if needed.

When a user input is received via the live interface (400) describing a message that the collaborating user would like to share with other collaborating users, including in some implementations the user of the capture device (100), the management server may create and save (block 338) chat metadata associated with the session and user. Such metadata may describe the message that was shared, the time it was shared, the user it was shared by, and other similar information, and may be associated with the content so that discussions occurring during viewing of the content may be shared amongst collaborators in real-time, and later viewed as a historical indicator of the thoughts or discussions that were shared during various portions of the interview. As an example, where several users are collaborating to view an interview of a user of product X, it may be useful to allow them to share messages with each other to discuss the interview, and may also be useful to view those comments and the times that they occurred at a later date, to see which portion of the interview content triggered a specific discussion point or thought.

As user inputs are received by the management server (30) and acted upon, the management server (30) may then update (block 340) the live interface (400) and capture interface (102) in order to reflect any changes. This allows all the collaborative users to view activity related to comments or keywords (block 330), content clips (block 334), and ongoing discussions (block 338) in near real-time as they are occurring, and in some cases while the session is still ongoing. It may be advantageous in some implementations to store and associate user inputs during the collaboration process only as metadata (e.g., without making any permanent changes to content itself) because it prevents the risk of race conditions or other timing issues resulting in users corrupting or undoing each other's work during the collaborative process, as may exist in conventional systems where users may each download their own copy of video content and modify it in isolation without any visibility of other changes.

Figure 8:
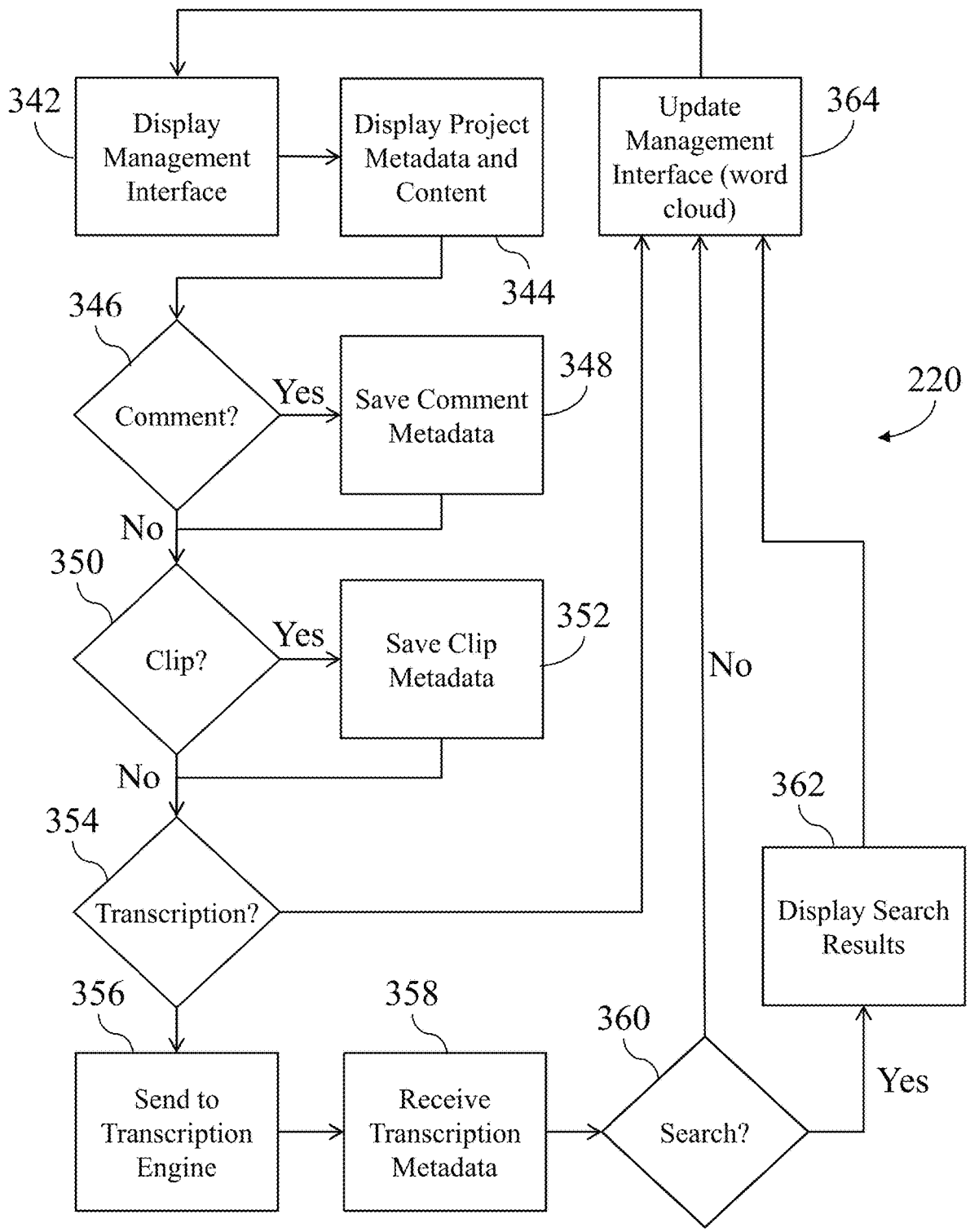
FIG. 8 is a flowchart of an exemplary set of steps that the curation system could perform to provide collaborative management of captured content.

Turning now to FIG. 8, that figure shows a flowchart of an exemplary set of steps that the curation system (10) could perform to provide collaborative management of captured content (220). In some implementations, the set of steps may be performed by the management server (30) in order to provide the collaborative management features to one or more collaborating users via the management interface (500). The management interface (500) may be displayed (block 342) to one or more collaborating users that are connecting to the management interface (500) via a software application, web browser, or other interface. The management interface (500) may have various controls and interactive features that, when interacted with by a user, will allow the user to collaboratively manage the content. Any metadata and content associated with the project or sessions of the project may also be displayed (block 344) via the management interface (500). This may include displaying and allowing users to view content, and view any comments, clips, chat logs, or other metadata information that was associated with the content, by that user or another, via the live interface (400) or the management interface (500).

As an example, in a situation where several users viewed content such as a video interview as it was occurring via the live interface (400), and added keywords indicating moments during the interview where a product X was discussed, a user later accessing the same content from the management interface (500) would be able to view the same keywords and associated moments in the content.

Similar to the use of the live interface (400), collaborating users accessing the management interface (500) may submit comments (block 346) or keywords to be associated with the project or session, or particular times or ranges of times within a session, which will be saved (block 348) as metadata and associated with the content, and may also clip (block 350) content into sections or portions to indicate a change in subject matter or topic, which will be saved (block 352) as metadata and associated with the content.

The management interface (500) may also allow users to submit requests for transcription (block 354) of audio or video content. Upon a transcription (block 354) request, the management server (30) may send (block 356) information to a transcription engine, where the associated content will be transcribed, translated, or both based upon the request, as will be described in more detail below. Upon receiving (block 358) transcription metadata from the transcription engine, the management server (30) may associate the transcription metadata with the content and then provide additional user inputs that a user may use to search audio or video content using search terms, with results being returned based upon the transcription metadata. After transcription (block 358), when a search term is received (block 360) the management server (30) may display (block 362) the search results via the management interface (30) to the searching user. Search results may be displayed in various forms, and may include displaying text indicating times within audio or video content where the search term is spoken, displaying text indicating sentences or paragraphs which contain the search term or that immediately precede or follow the search term, displaying screenshots of video content or viewable sections of video content associated with the search term, displaying heat maps, word clouds, graphs, charts, or other information indicating the occurrence or frequency of search terms in various portions of content, and other similar display methods.

As collaborative users interact with the content via the management interface (500), the management server (30) may update (block 364) the manage interface to reflect those changes. This may include, for example, displaying comments or clips added by users, and causing transcription metadata to appear in various forms such as captioning in video content, captioning for audio content, standalone text that may be browsed or searched independently of content, word clouds, heat maps, charts, and graphs. As with the live interface (400), the updated (block 364) management interface may update for all collaborating users collectively so that the input of each individual user is automatically shared with all other users.

Figure 9:
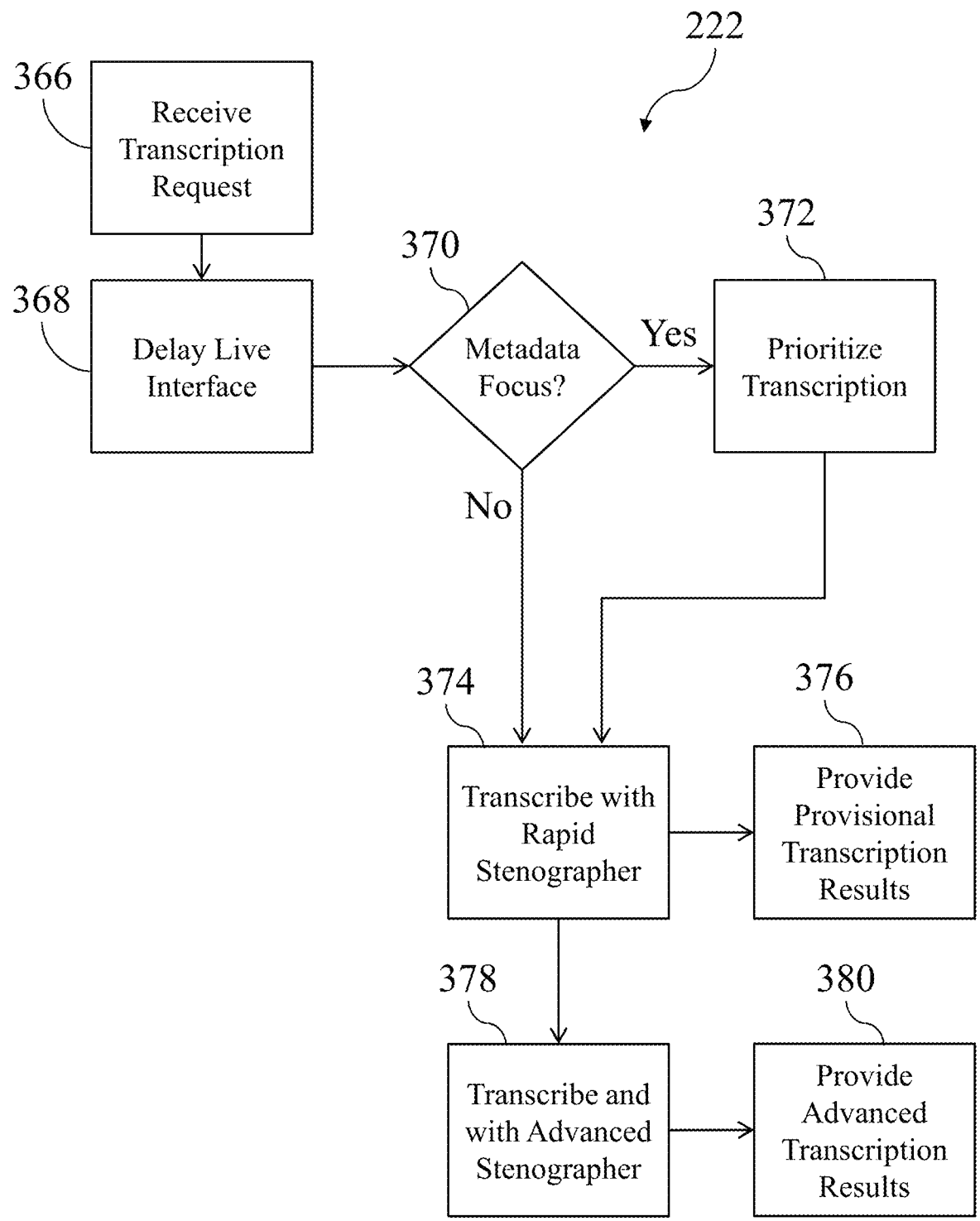
FIG. 9 is a flowchart of an exemplary set of steps that the curation system could perform to provide transcription during content capture, content management, or both.

The transcription engine from which transcription metadata may be received (block 358) may be implemented in various ways. For example, in some implementations the transcription engine may be provided by a third party, content may be sent (block 356) to the third-party transcription engine via an API or other interface. In other implementations, the transcription engine may be a process or application of the management server (30), or may be a dedicated system or server of the curation system (10). FIG. 9 shows a flowchart of an exemplary set of steps that the curation system (10) or transcription engine could perform to provide transcription of content during content capture, content management, or both (222). Transcription may include text transcription of speech, and may also include translation from an original language into one or more other languages. For example, spoken words in English may be transcribed to English text, as well as French, Spanish, and other languages, as may be desired.

When a content transcription request is received (block 366) from a user, if it is received via the live interface (400), the content display of the live interface (400) may be intentionally delayed allowing time for transcription so that users collaborating on the live interface (400) may view transcription results as they first view the content in real time. This may be useful where, for example, a number of collaborating users are viewing an interview of a consumer via the live interface (400). In such situations, collaborating users may be hearing impaired, may have difficulties in understanding the interviewee, may not be fluent in the interviewee's language, or may simply desire to read captioned text along with the interview content. The live interface (400) may be delayed (block 368) by, for example, building in a static delay at the start of the interview before the live interface (400) display of the content becomes available, or reducing the display speed of captured content to build up a delay over time. Where the transcription request is not received during a live capture session, such as when the request is received via the management interface (500), delaying (block 368) may be unnecessary.

In either case, as content is received (block 366) for transcription, it may be associated with metadata indicating a particular focus (block 370) on the content that may be used to prioritize (block 372) the content for transcription in one or more ways. Prioritizing (block 372) transcription may be advantageous where, for example, transcription is being performed by software that requires time consuming processing of data, is being manually performed by live transcribers, or a combination of both. For example, if a video interview of a product user or consumer is 20 minutes in length, some implementations of a transcription engine may require 40 minutes to produce transcribed text, making it difficult or impossible to offer transcription results in near real-time during content capture, immediately after content capture ends, or immediately upon a later request for transcription via the management interface (500).

In such a case as above, where transcription has been requested via the live interface (400) or management interface (500), and the associated content has also been associated with metadata such as comments, keywords, points of interest, clips, or other indications from collaborative users that the section of content has high or low relevance or interest, high priority areas may be given priority (block 372) in transcription in order to reduce or eliminate any delay in transcription. In the above example, if 8 minutes of the 20 minute interview may be identified as high interest based upon keyword and clip metadata, the 8 minutes of content may be transcribed in 16 minutes rather than 40 minutes, and may as a result be available during live capture, immediately after, or more immediately upon later demand.

After content has been prioritized (block 372) or, where no prioritization occurs, the content may then be transcribed using one or more software applications or other methods of transcription. As an example, some implementations of the transcription engine may include a rapid stenographer such as an automated software process that may be used to generate text from speech quickly, with a moderate or low degree of accuracy, as well as an advanced stenographer, which may be a more advanced automated software transcription process, a human driven transcription process, or a combination, that may be used to generate text from speech more slowly, but with a higher degree of accuracy.

With such a system, the content may first be transcribed (block 374) with the rapid stenographer in order to produce a provisional transcription result, which may be provided (block 376) to the requester. In parallel, the content may also be transcribed (block 378) with the advanced stenographer in order to produce an advanced transcription result, which may also be provided (block 380) to the requester. Such a system may be advantageous where, for example, transcription is desired by collaborating users immediately, as a provisional transcription result may be provided (block 376) in a matter of seconds or minutes, while an advanced transcription result may not be available to provide (block 380) for several hours. In such a case, collaborating users may use the provisional transcription results as soon as they are provided (block 376), with such transcriptions being automatically replaced by the advanced transcription results when they are provided (block 380).

It should be noted that the steps of FIG. 9 are exemplary, and variations exist. As described above, some transcription engine implementations may simply send content to a third-party API or other interface and receive results. Other implementations may not prioritize transcription in any way, and may simply provide transcription results sequentially. Further implementations may only use automated software transcription to produce provisional transcription results, or may only use advanced transcription methods to produce advanced transcription results. In addition to the capabilities of automated and/or manual transcription, some implementations may also be capable of automated and/or manual translation, as will be apparent to those skilled in the art in light of this disclosure.

Figure 10:
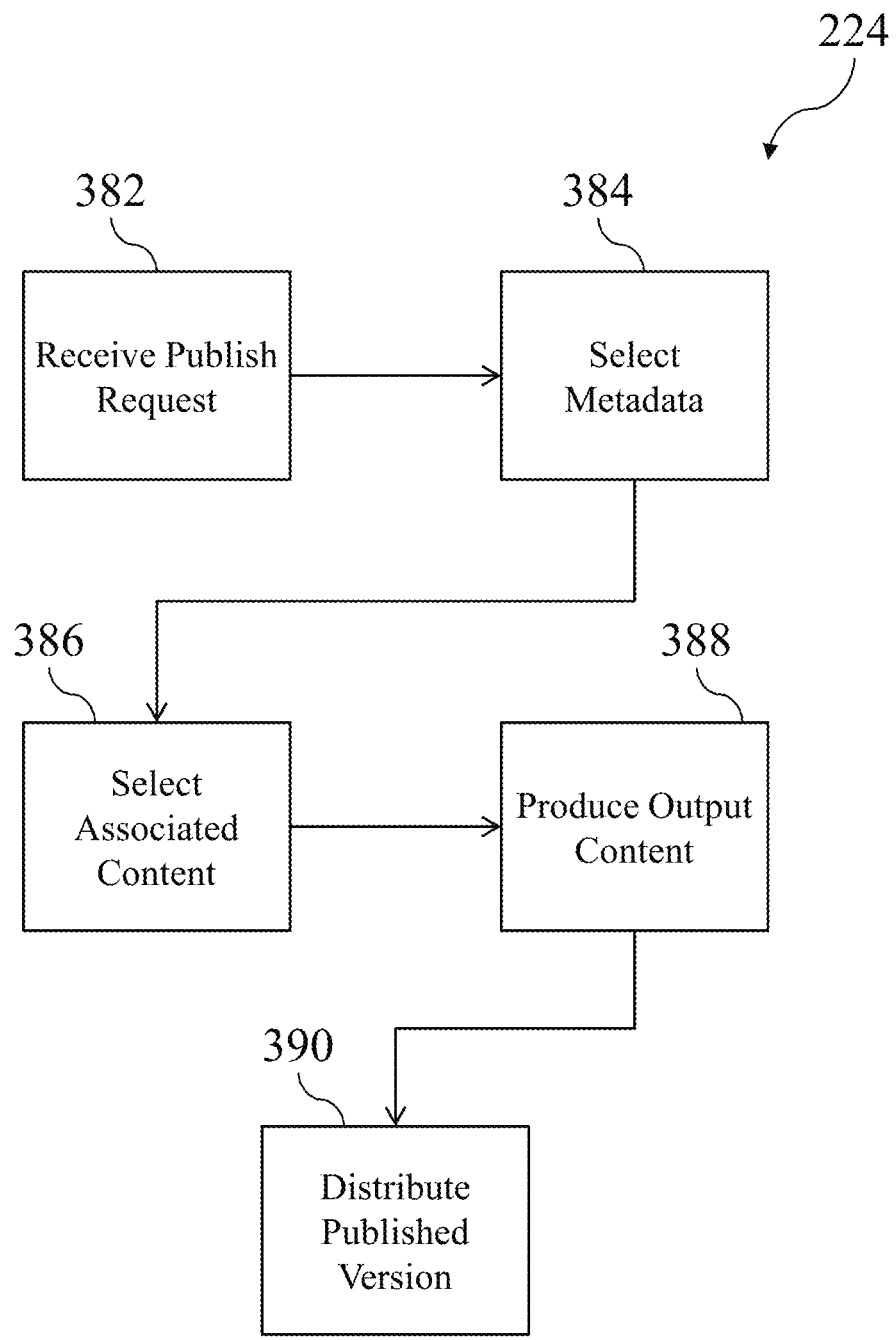
FIG. 10 is a flowchart of an exemplary set of steps that the curation system could perform to publish and distribute content.

Turning now to FIG. 10, that figure shows a flowchart of an exemplary set of steps that the curation system (10) could perform to publish and distribute content. After collaborative users have accessed the content via the management interface (500) in order to view or modify it, they may wish to publish and distribute the content in various ways. As an example, where the content is a 20-minute interview of a consumer, one or more of the user may add keywords or comments, subdivide the 20-minute interview into one or more clips, delete some clips and retain others, perhaps add clips from other project sessions, add transcription to the content, or associate other metadata with the content as has been described above, and then distribute the newly created output video.

In such a case, a publishing request may be received (block 382) via the management interface (500) indicating the content, content clips, transcriptions, and other metadata of the project that should be included in the output video. Based upon the received (block 382) request, the management server (30) may select (block 384) a set of content metadata (e.g., comments, keywords, transcriptions, clips) associated with the request, and may select (block 386) a set of content (e.g., video, audio, images) associated with the request, and may produce (block 388) the output video by reorganizing and combining the set of content and the set of content metadata as indicated by the request.

This may include steps such as reorganizing and combining clips from one or more content sessions, separating clips with images or text headers, captioning clips with transcriptions, and otherwise editing and modifying the content into the output video based upon the request, and creating the output video as a file or set of data to be stored on the content storage server (20) or another device.

One or more of the collaborative users may then provide inputs to the management interface (300) to cause the management server (30) to distribute (block 390) or publish the output video in various ways. This may include, for example, providing a downloadable file of the output video, transmitting an electronic message to which the output video is attached, or which contains an electronic link to the output video, sharing the output video to various social media platforms, and other similar methods of publishing and distributing content. Once produced (block 388), the output video may be associated with the project so that it is later viewable via the management interface (500), so that collaborative users may modify and create new versions of the output video, or create additional output videos based upon different combinations of content clips.

FIGS. 11-18 show simulated screenshots of interfaces such as the live interface (400) and management interface (500), and may be displayed to collaborating users in order to provide information and receive inputs that may be used by the management server (30) to perform one or more of the actions described above.

Figure 11:
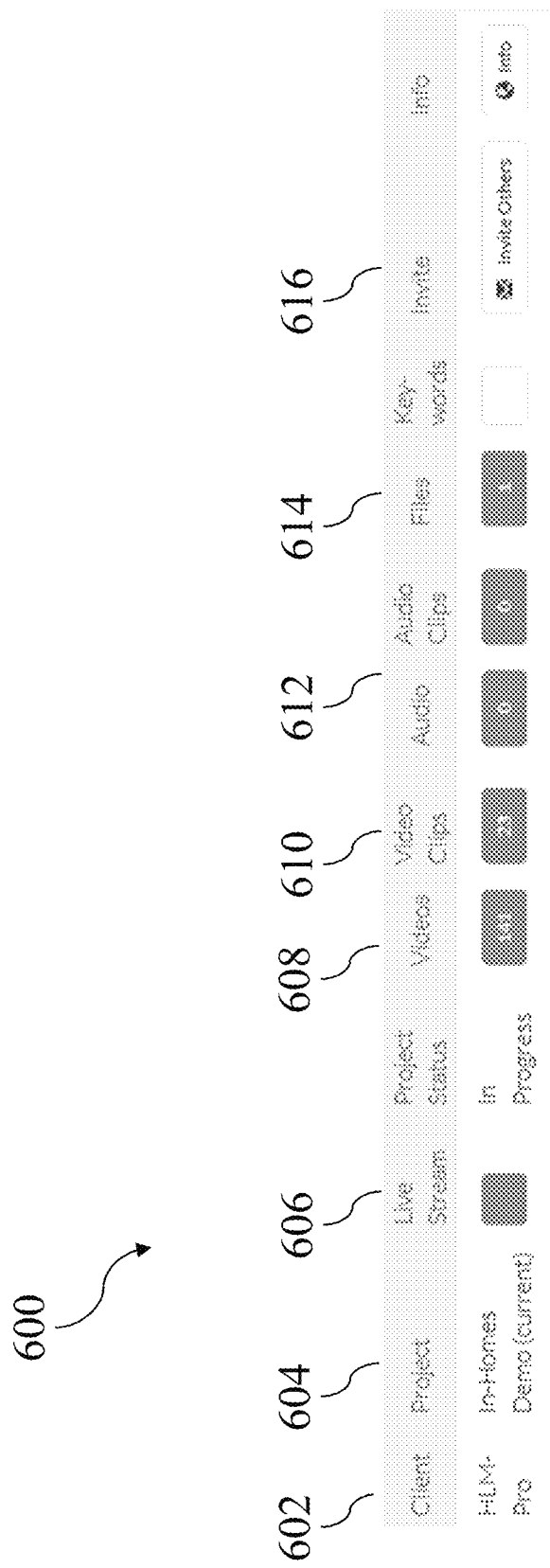
FIG. 11 is a screenshot of an exemplary project selection interface that may be provided by the curation system.

FIG. 11 shows a project selection interface (600) that may be used to select a project to view and manage. Information and features may include a description of the customer (602), a description of one or more projects (604) being collaborated on by the customer, a status indicator (606) showing whether any content capture sessions are currently live, a description of the number of content sessions (608) currently associated with the project (e.g., a number of individual video interviews performed for the project), a number of video clips (610) that have been created by users (as described in the context of FIGS. 7 and 8), a number of audio sessions and audio clips (612) (e.g., audio interview content and clips), a number of other files (614) associated with the project by a user (e.g., images, documents, or text added to the curation system (10) for use with content), and an invite button (616). Each piece of information or button shown may be interacted with by a user to gain more information (e.g., hovering over a project name (604) to view a project description in a pop-up window), navigate to a new interface (e.g., clicking on a project name (604) to see content associated with the project), or perform another action (e.g., clicking on an invite button (616) to enter email addresses or contact information of collaborating users that should be granted access to the live interface (400) or management interface (500)).

Figure 12:
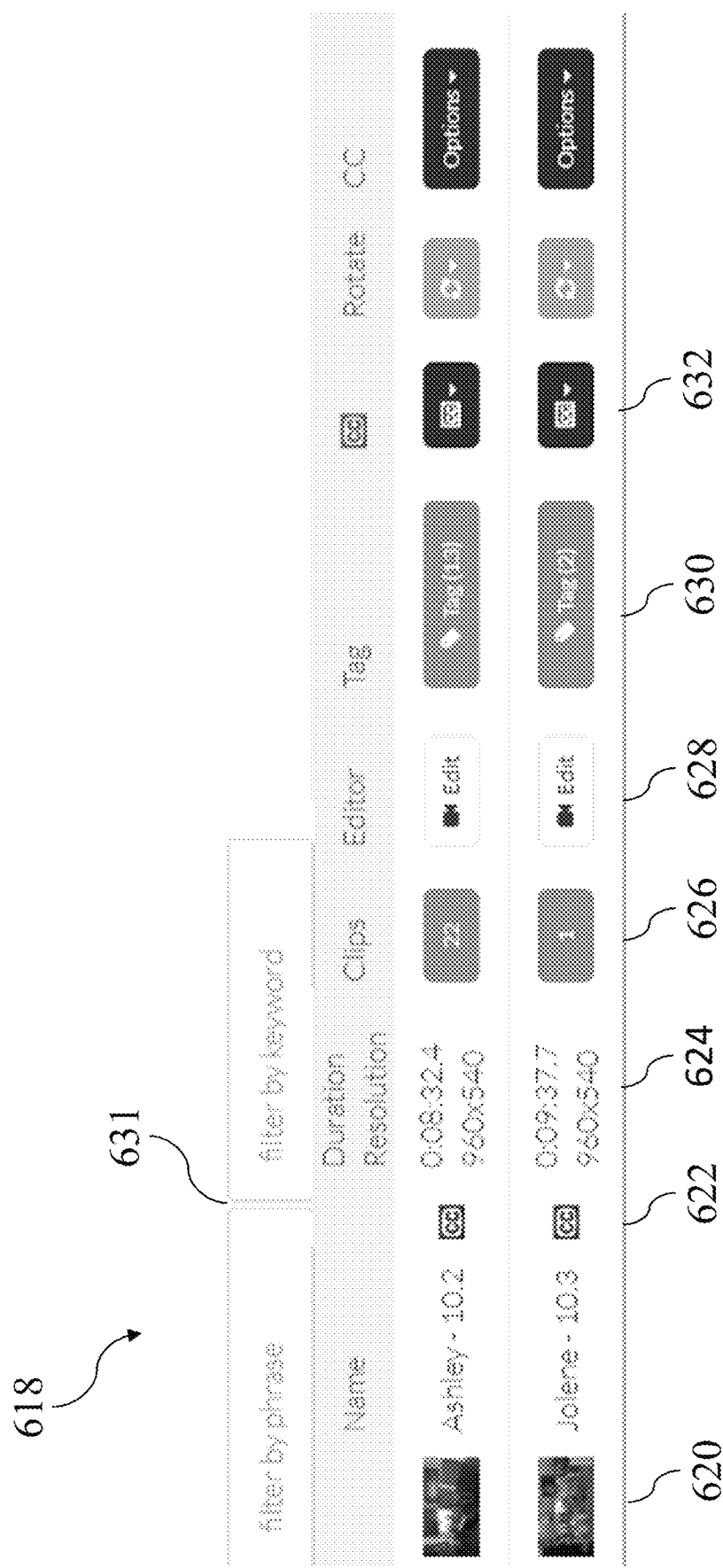
FIG. 12 is a screenshot of an exemplary content management interface that may be provided by the curation system.

FIG. 12 shows a content management interface (618) that may be used to view content session information and interact with content sessions (e.g., individual video interview sessions). The content management interface (618) may be reached by, for example, clicking on the project name (604) in another interface. Information shown may include a thumbnail of the content (620), a transcription indicator (622) that, when present, indicates that the content has been transcribed and transcription results are available, a duration and type (624) indicating the length of the content session and type of content (e.g., resolution of video content, bitrate of audio content), a number of clips (626) that have been created from a particular content session, an edit button (628) usable to navigate to an editing interface for a particular content session, a tag indicator (630) indicating a number of comments, tags, or keywords that a collaborating user associated with a content session (as described in the context of FIGS. 7 and 8), a filter input (631) that may receive text to be used to filter content sessions to those tagged with search terms or associated with transcription metadata containing search terms, and a transcription request button (632) usable to submit the content session for transcription. Each piece of information or button shown may be interacted with by a user to gain more information (e.g., hovering over a project thumbnail (620) to view a larger version), navigate to a new interface (e.g., clicking on the number of clips (626) to view a clip specific interface, clicking on the number of tags (630) to view a tag specific interface), or perform another action (e.g., clicking on the transcription button (632) to cause content to be transcribed).

Figure 13:
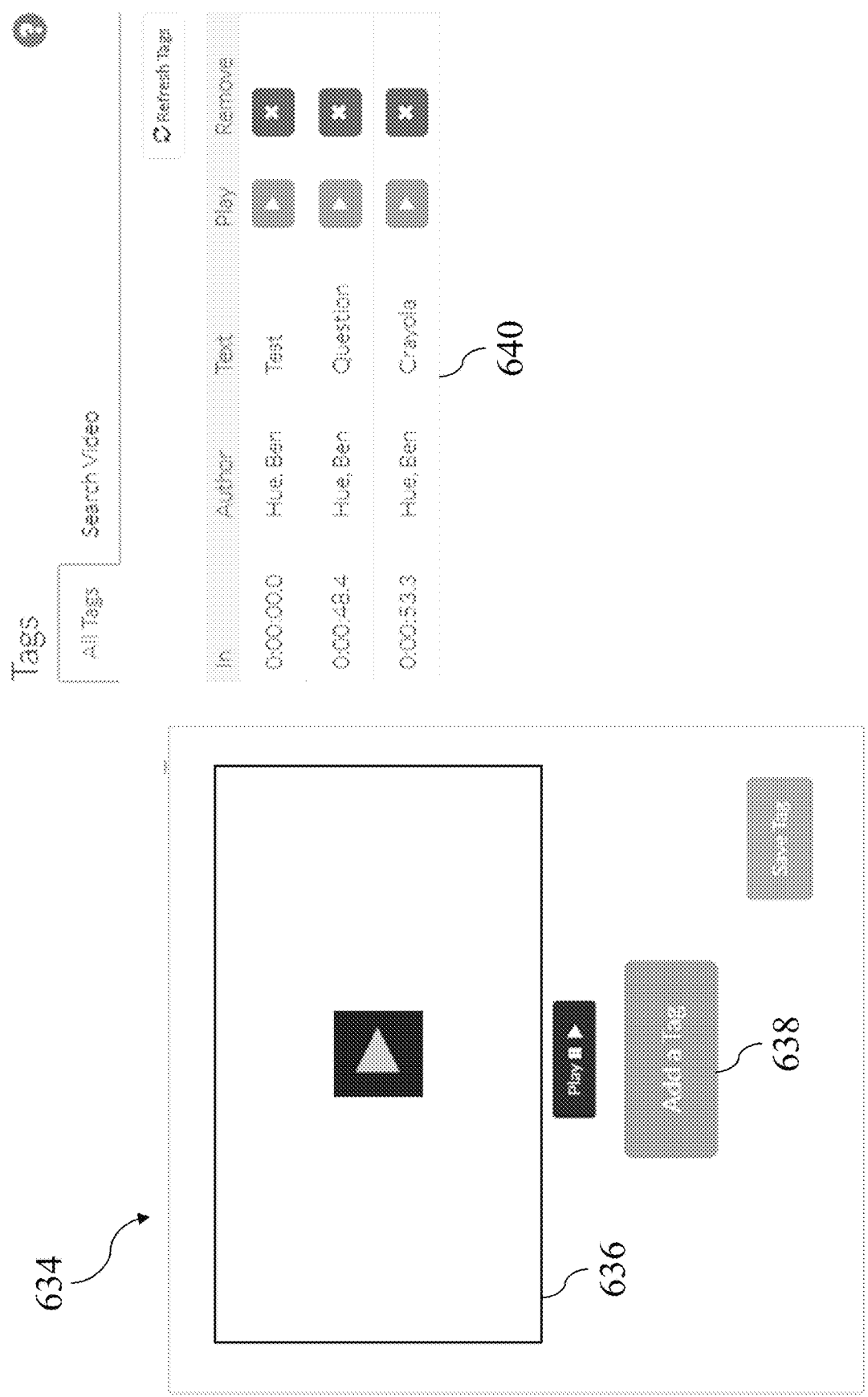
FIG. 13 is a screenshot of an exemplary content viewing interface that may be provided by the curation system.

FIG. 13 shows a content viewing interface (634) that may be used to view and modify content sessions, and that may be reached by, for example, clicking on the thumbnail (620) for a particular content session. Information shown may include a content panel (636) where video, audio, or other content may be viewed or listened to, a tag button (638) usable to add text tags to content being viewed in the content panel (636), and a list of tags (640) showing tags that collaborating users have associated with the content in the content panel (636), as well as the tag author, text, moment in content, and controls for navigating the content panel (636) directly to a moment associated with a tag with a single click. As with other interfaces, users may interact with the information provided by the content viewing interface (634) to gain more information, navigate to other interfaces, start and stop content within the content panel (636), add tags (638), view information on authors and tags, navigate to various moments within content, and other similar uses.

Figure 14:
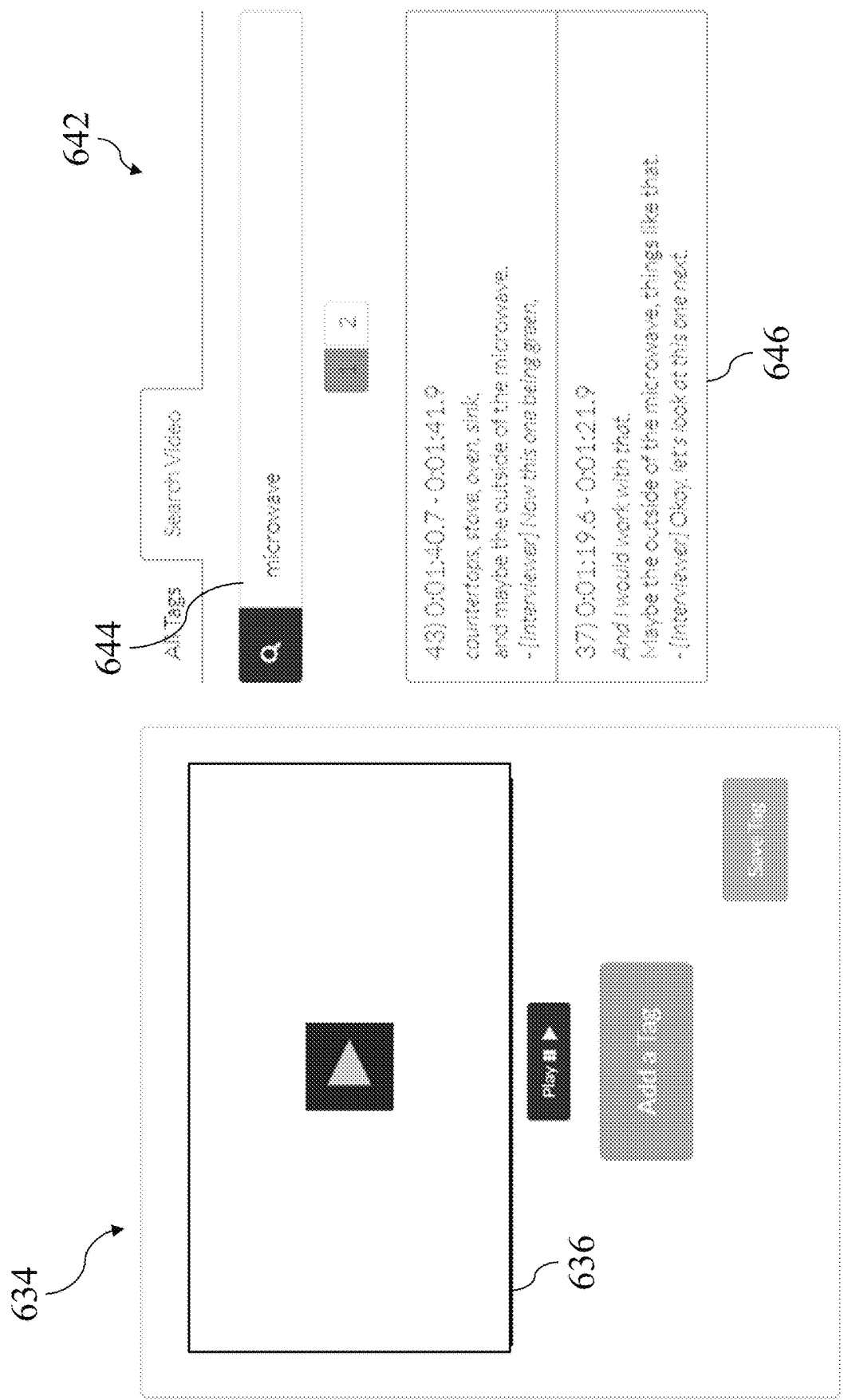
FIG. 14 is a screenshot of an alternate view of the content viewing interface.

FIG. 14 shows an alternate view of the content viewing interface (634) which additionally shows a content search bar (642). The content search bar (642) may be used to type words or phrases into a text input (644), which the management server (30) will use to search against transcription metadata associated with the content being displayed in the content panel (636). Where the search terms are identified within the transcription metadata, a set of search results (646) may be displayed providing additional information such as a moment in the content in which the term is spoken and the context in which the term is spoken, as well as a tool or link that may be interacted with (e.g., clicking on the time period or range or other text or objects within the set of search results (646)) in order to cause the content panel (636) to skip to the time period or range in which the search term is spoken.

Figure 15:
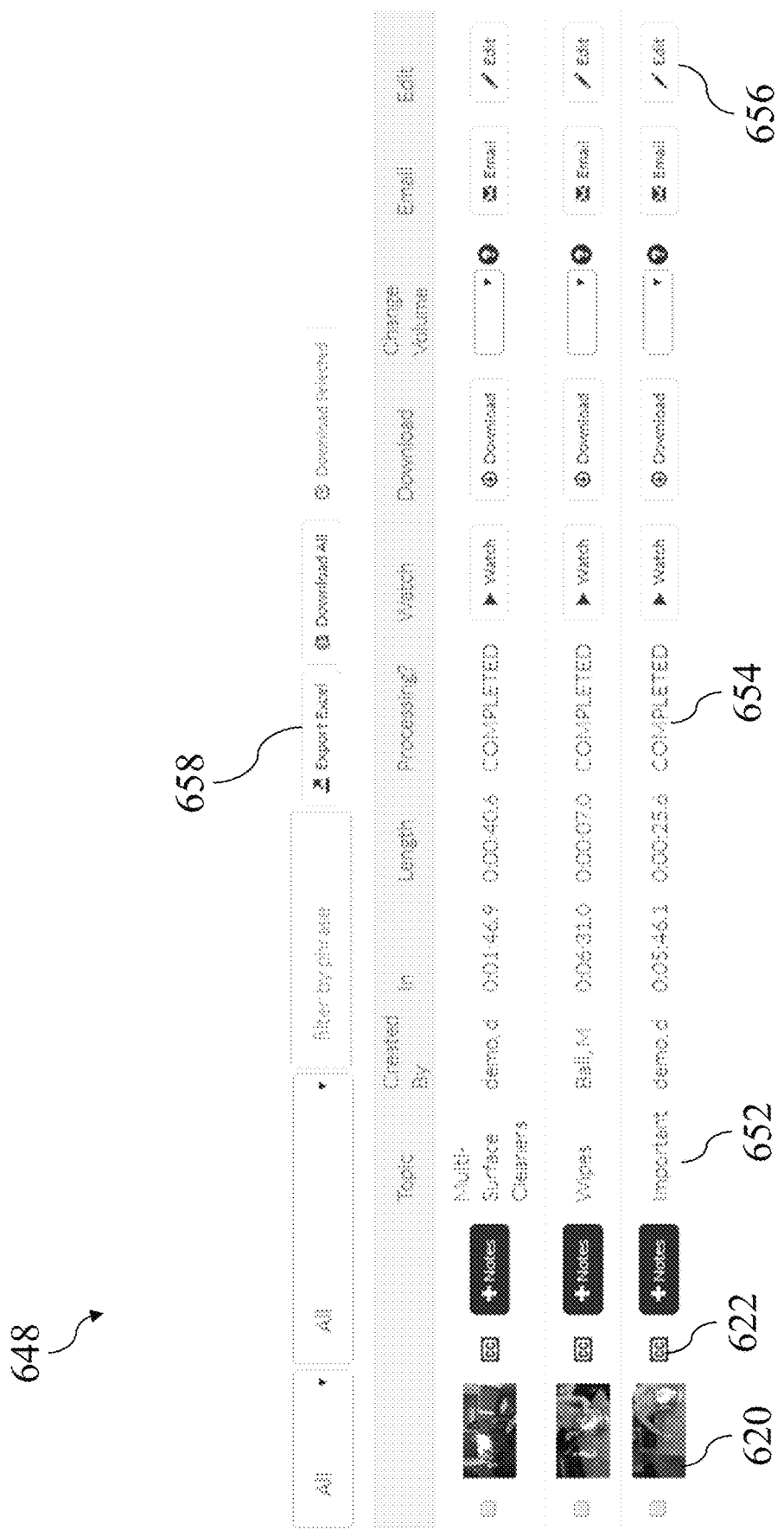
FIG. 15 is a screenshot of an exemplary clip management interface that may be provided by the curation system.

FIG. 15 shows a clip management interface (648) that may be used to view and interact with content clips, and that may be reached by, for example, clicking on a description of the number of clips (626) associated with a particular content session or project. Information shown may include thumbnails (620) or previews of the clip, the transcription indicator (622) to indicate whether the clip has been transcribed, a topic (652), keyword, comment, or other term associated with the clip by a collaborative user, a processing indicator (654) that may provide information on the status of the clip (e.g., whether transcription is complete, whether output video associated with the clip is complete), an edit button (656) that may be used to view the clip in an editing and publishing interface, and export options (658) such as exporting to spreadsheets or other formats, or exporting as a downloaded video file of the clip. Exporting content and metadata associated with a clip as a spreadsheet or other standardized format may be helpful to allow content from the curation system (10) to be more readily exported to other content management systems, or other instances of the curation system (10).

II. Exemplary Interfaces and Methods for Visual Timeline

Figure 16:
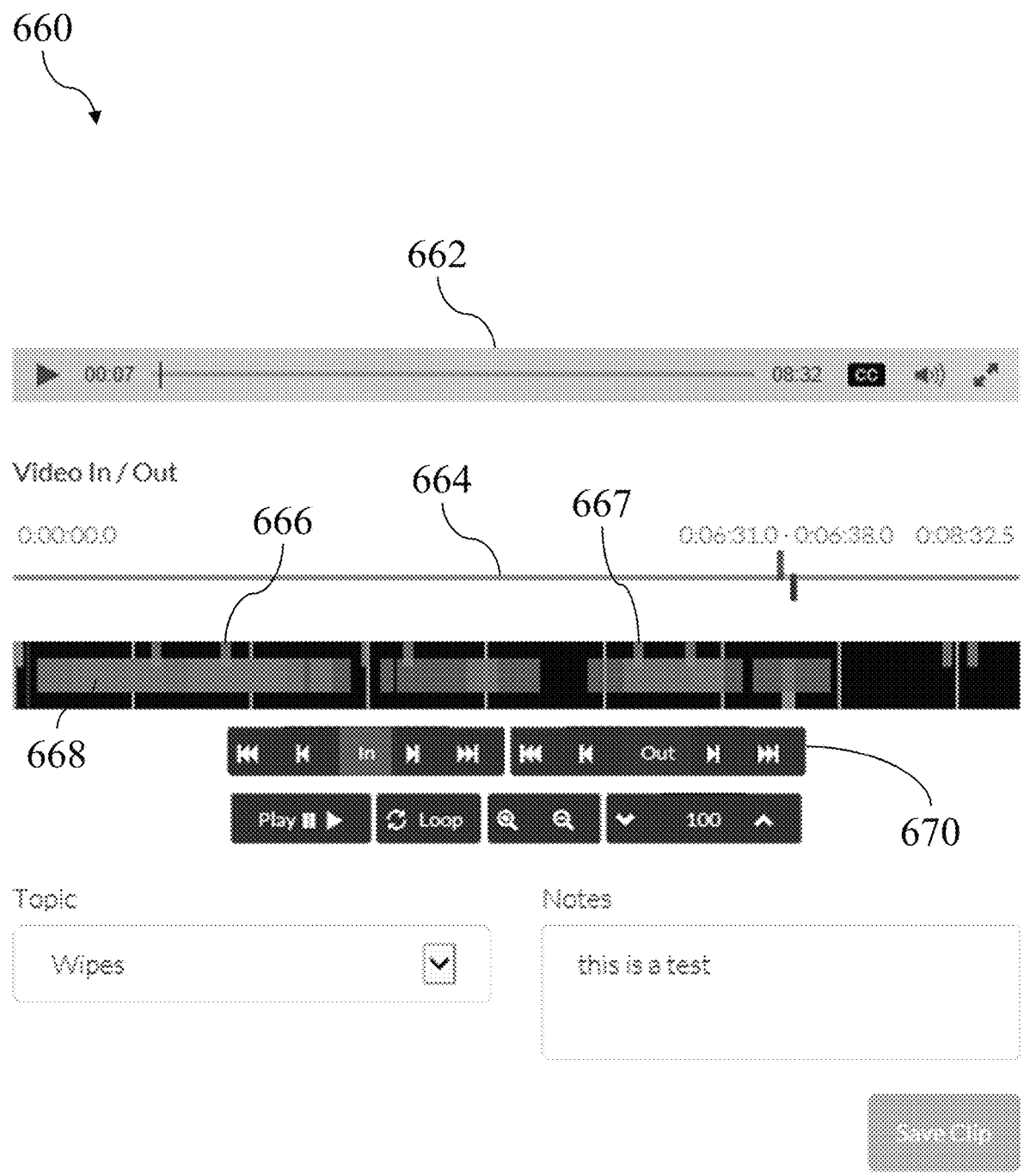
FIG. 16 is a screenshot of an exemplary navigation pane that may be provided by the curation system.

FIG. 16 shows a navigation pane (660) that may be displayed as a visual timeline when a clip is being edited and published, or in real-time as content is being captured and viewed. A content bar (662) and content controls (670) may be interacted with by a user to navigate through audio or video content, to navigate through a set of images or documents, and may allow advancing content, reversing content, zooming in and out on content, increasing and decreasing volume, starting and stopping content, looping content, and other similar controls. A clip timeline (664) may be interacted with by a user to set and adjust the start point of a clip and endpoint of a clip. A content timeline (666) may show metadata that each collaborative user working on the project has associated with a piece of content, including the clip that is currently being viewed. For example, an 8-minute video may have been organized into 10 different clips occurring at various points during the 8-minute length, and in some cases overlapping. While viewing a first clip in an editing and publishing interface, the existence and location of each of the other nine clips may be presented on the clip timeline (664) as clip block (668) to provide improved visibility on what other collaborators are working on, and allow collaborators to avoid duplicative or wasteful effort. Clip blocks (668) may appear on the clip timeline (664) in varying colors, shapes, transparencies, and other visual signifiers as may be desirable to differentiate between various clip blocks. The navigation pane (660) may also comprise keyword markers (667) indicating areas within content and clips where collaborating users have added keyword, note, or comment to be associated with that moment in the content or clip. As with prior examples, clip blocks (668) and keyword markers (667) may be interacted with in order to advance a content player to an associated moment within content automatically.

Other variations on the navigation pane (660) exist, and may be implemented to provide different visual timelines that allow users of the curation system (10) to interact with and curate content in different ways. As an example, in some implementations, the visual elements of the content timeline (666) such as the keyword markers (667) may be automatically customized to indicate various characteristics of the keyword, comment, tag, or other information that has been added to the timeline. This could include rendering the keyword marker (667) in a different color or shape to identify the user that added the marker. This may be useful where multiple users are collaborating to view and edit a clip, so as to visually indicate by color or shape a particular collaborator associated with the marker. For example, where a team of collaborators included a person that is responsible for tagging, marking, or commenting any portion of a clip that discusses a particular product negatively, rendering the keyword markers (667) that are created or added by that user in a distinct color or shape as compared to other users can visually identify that type of content along the content timeline (666).

In some implementations, a feature may be provided to allow a user to search keyword markers (667) in a single clip or across a group of clips or other content (e.g., multiple clips associated with a single project) so that users can quickly identify the clips that they are interested in. Such search results may be displayed textually by displaying the text content associated with the keyword markers (667), or those matching keyword markers (667) may be rendered so that they are visually distinguishable from others along the content timeline (666) (e.g., matching keyword makers (667) may be rendered as green or as a triangle, while non-matching keyword markers (667) may be rendered as grey or as a rectangle).

In some implementations, a feature may be provided to allow users to define and customize a range of keyword markers (667), which may be selected from when tags or comments are manually or may be automatically applied to content along the content timeline (666). For example, an interface control may be provided in the navigation pane (660) that allows a user to add a keyword marker (667) having a desired visual appearance. This may include providing several interface buttons that may be interacted with in order to add a keyword marker (667) having a desired color and shape (e.g., a red triangle, a green triangle, a blue triangle, etc.), with each color and shape having been associated by the user with a different aspect of the content that the user is interested. Such variable markers may be used by the user and other collaborators to quickly categorize sections of interest within the content, with such categorizations being usable by the collaborators to later review when the meaning of each marker is known.

While the above implementation may rely on collaborators agreeing amongst themselves on a meaning for each marker, some implementations may also include automatically adding text or other information to the keyword marker (667) that has been customized by the user. For example, where a customized keyword marker (667) appears as a red triangle, it could also be associated with the text "negative commentary on product." This text could be automatically added as a human readable comment or tag, as has been described, allowing for single click marking and commenting along the content timeline (666), with the tag and comment text being searchable as has been described. In such an implementation, multiple collaborators could review and mark content with keyword markers (667) that are customized to automatically be both visually distinguishable and associated with particular text or comments, without requiring that the user manually add comments for each keyword marker (667).

Any of the above disclosed features of the keyword marker (667) may additionally be combined with an implementation of the navigation pane (660) that is operable to automatically convert content that is associated with a keyword marker (667) into a clip, or a sub-section of that content. As an example, where keyword markers (667) are uniquely associated with the user that created the tag or comment, the system may be operable to automatically create video clips that include content immediately before and immediately after the marker (e.g., between about 5-30 seconds before and after, or other suitable numbers or ranges) for each keyword marker associated with a particular user. This may let each user automatically generate clips from a larger piece of content that are each associated with their tags or comments or another users tags or comments.

As another example, where keyword markers (667) are visually distinguishable for other reasons, such as where they may be customized and associated with particular topics of interest (e.g., a red triangle marker may indicate a negative experience with a product associated with the content), the system may be operable to automatically identify each such marker and create sub-content clips covering a period of time before and after the marker. This may be useful to isolate a relatively small number of clips from a larger piece of content so that a user can easily view or share only the relevant portions of content. In some cases, an overall piece of content may be four or more hours in length, and so the ability to tag sections of the content (e.g., by selecting and manually typing in a comment, keyword, or description, or by selecting a customized marker that is pre-associated with a comment, keyword, or description) in real time as the content is captured, or to tag sections of the content during later review, and to automatically produce clips based on such markers can be advantageous. Real time tagging and automatic clipping may be performed by an interviewer or other user that is proximate to the capture device (100) or may be performed by remote users viewing the content via the live interface (400) or another remove interface. Automatic creation of sub-content clips from the overall content may be configured as desired by a user in order to determine how much preceding and subsequent content is added to each clip, and automatically created clips may be generated as separate clips or may be aggregated into a single clip, as may be desired.

As has been described, any of the above marking features may be performed via the capture device (100), the live interface (400), or another interface in communication with the curation system (10). Marking via the capture device (100) be performed through interaction with a software application on the capture device (100) that provides an interface such as the navigation pane (660). Marking via the live interface (400) may be performed through interaction with a software application (e.g., a dedicated application, a web browser) that provides an interface such as the navigation pane (660). Other interfaces and devices for marking during initial capture of content or later review exist.

For example, a mobile device such as a smartphone or tablet may include a software application that does not display content as it is captured, and may lack other aspects of the navigation pane (660), but that may include interface elements operable to tag and comment content that is being captured or reviewed, and which the mobile device is associated with. For example, where several interviewers may be capturing content with the capture device (100), one interviewer may use the capture device (100) to perform tagging and marking of content, while another interviewer may use their mobile device configured with a software application that allows markings to be added to the same content, but that does not display the content (e.g., such as via the live interface (400)). The interview using the mobile device may simply view the interview in person instead of viewing it via the live interface (400), and any tagging, commenting, or other marker inputs from that user may be transmitted to the management server (30) and/or capture device (100) and added to the associated content based upon a comparison of the time of tagging (e.g., where the mobile device or a universal timekeeper process indicates the tag was added via mobile device at 12:00 pm, the portion of captured content that is associated with being captured at 12:00 pm will receive the marker).

While implementations of the curation system (10) that include multiple devices (e.g., capture devices and/or other curation devices) will be discussed in more detail below, one implementation of the visual timeline described herein may be useful for public presentation, teaching, or other similar activities. For example, where a speech or lecture is recorded with the capture device (100), a visual timeline may be displayed in real time by an interface such as the navigation pane (660). This interface may be viewed by the speaker or teacher, or by another person during the lecture or speech. Students or audience members may have a mobile device configured to allow for the addition of markers to the content as has been described.

As an example, a student attending a lecture may have a smartphone configured with a software application that provides content marking controls. When the student is confused during the lecture, or finds a particular portion of the lecture to be very helpful, or in other situations, the student may mark the content appropriately (e.g., via a manually created tag or comment, or by use of a customized mark, as has been described). The visual timeline may display the keyword markers as visually distinct based upon the number of students marking that content or content within a configured proximity of that content, such as by an increasing size of the marker, a varying color of the marker, a heat mapping of markers along the content, or otherwise. Such a visual timeline may be useful to provide an indication of portions of the speech or lecture that need to be covered again to clear up confusion, saved and used in subsequent lectures due to their effectiveness, or in other situations as may be desirably configured or customized. Where the system automatically created clips of the marked content, the presenter may advantageously present the clip content to re-introduce the topic on which there was confusion. Other such features of the navigation pane (660) and visual timeline exist and will be apparent to those skilled in the art in light of this disclosure.

Figure 17:
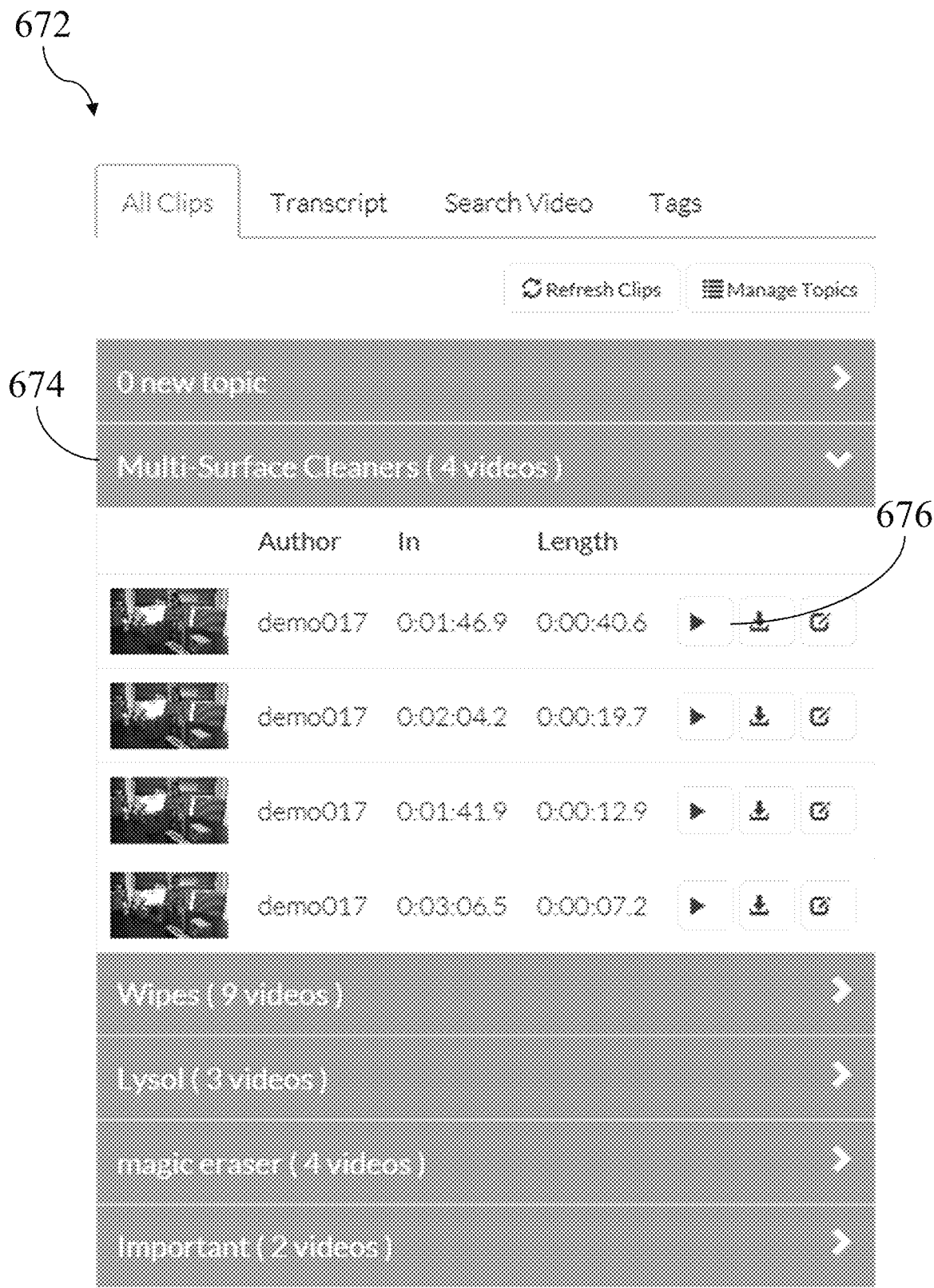
FIG. 17 is a screenshot of an exemplary clip pane that may be provided by the curation system.

FIG. 17 shows a clip pane (672) that may be displayed along with the navigation pane (660) or elsewhere. The clip pane (672) may allow users to view information on clips in a list organized by their topic (652) by clicking on a topic heading (674). Information presented for each clip may include details such as an author that added the clip, a moment in which the clip occurs within content, a length of the clip, and controls such as a play control (676) that may be interacted with in order to advance a content player to an associated moment within content automatically.

III. Exemplary Transcription Methods

Figure 18:
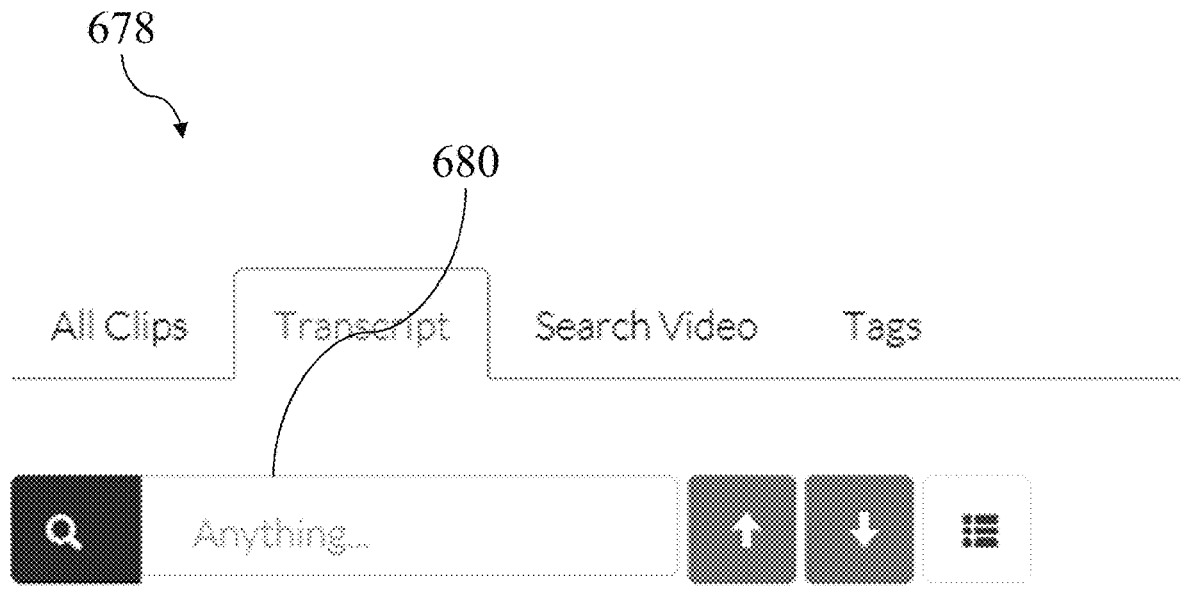
FIG. 18 is a screenshot of an exemplary transcript pane that may be provided by the curation system.

FIG. 18 shows a transcript pane (678) that may be displayed along with the navigation pane (660) or elsewhere. The transcript pane (678) may allow users to provide search terms to a search input (680) that may be used by the management server (30) to identify the presence of matching search terms within transcript metadata associated with the content or clip, and may also display the transcript metadata (682). Transcript metadata may be displayed as text that is being spoken at a moment within the content, and may be bolded, underlined, or otherwise presented in order to indicate a portion of the transcript metadata (682) associated with content that is immediately being presented by a content player, which may allow users to view content with captioning. Search terms provided to the search input (680) may cause matching text within the transcript metadata (682) to be highlighted or filtered, and may also allow users to step sequentially through matching portions of the transcript metadata (682) to view each portion of content and associated transcript metadata individually. Other variations, combinations, features, and controls beyond those presented in FIGS. 11-18 exist and will be apparent to one of ordinary skill in the art in light of this disclosure.

While various features and interfaces have been described for the transcript and translation aspects of the system, other exist and may be implemented with the curation system (100). For example, during live viewing of content or later review of content the transcript text may be synced to the content or clip and displayed at the appropriate times during the content or clip. Such text may be displayed in a separate window or interface, or may be overlaid upon the content or the content clip as a permanent portion of the video content.

In some implementations where transcription content is displayed as shown in FIG. 18, a user may interact with the transcript directly to change or revise text, create content clips of the text and associated content, or mark the content (e.g., as described above in the context of keyword markers (667)) directly from the transcript pane (678). For example, selecting (e.g., using a cursor or other selection tool) one or more lines of portions of transcript text may cause the system to automatically create a content clip from captured content associated with he selected text (e.g., video and audio content in which the text was originally spoken, which may also include a limited portion of content that surrounds the selected text). As another example, one or more words may be selected in order to cause a keyword marker (667) to be associated with that transcript text and corresponding content (e.g., a user may click a single word or select several words in order to add a manual tag or comment, or to mark the content with a customized marker, as has been described).

In some implementations, transcript text may be modified to include additional information such as differentiation or identification of the speaker. Different speakers may be differentiated based upon voice analysis, or based upon a configuration indicating the proximity of each possible speaker to each possible audio capture device. For example, where the capture device (100) is configured to capture audio content from an interviewer microphone and a separate interviewee microphone, each speaker may be identified based upon the volume of captured audio (e.g., the interviewer will be detected as a loud voice on one microphone and as a quiet voice on the second microphone).

In some implementations, a user of the curation system (10) may be able to leverage one or more of the transcription features over a large collection of content to advantageously identify clips and content that they are interested in. For example, a user associated with a large corporation may have many distinct projects configured within the curation system (10), and each project may have many distinct portions of content and content clips, such that in some cases the user may have thousands of hours of captured content available. A text search by the user may be performed on all available content, confined to a particular project, confined only to content, or confined to content clips, and may return content and content clips in which the text search is present within the associated transcript text. This may be useful where the user believes that past captured content may include valuable insights that were not previously recognized as valuable or relevant, as the user can perform text searches to identify the now relevant content within the transcript, and cause the system to automatically generate sub-clips that include the now relevant insights. With thousands of hours of content, it can be seen that the capability of performing a text search to automatically identify and isolate newly relevant content may be advantageous.

Individually or in combination with the above features, the system may also provide additional tools and interfaces for viewing and interacting with transcript text. For example, a word cloud may be presented that shows the repetition of various words across all content for a particular project, or across all user content. Such an interface may be useful to aid in identifying previously unrecognized insights, such as where users may commonly associate certain positive or negative attributes with a particular product in a pattern that is not recognized by any of the individual interviewers associated with the product. In such a case, a word cloud populated from transcript text for a collection of content or content clips may be useful in identifying this pattern. The user may then click on or select the word of interest within the word cloud to cause the system to automatically create clips from the content collection that include the word of interest, as has been described.

IV. Exemplary Multi-Device Curation Methods

Figure 19:
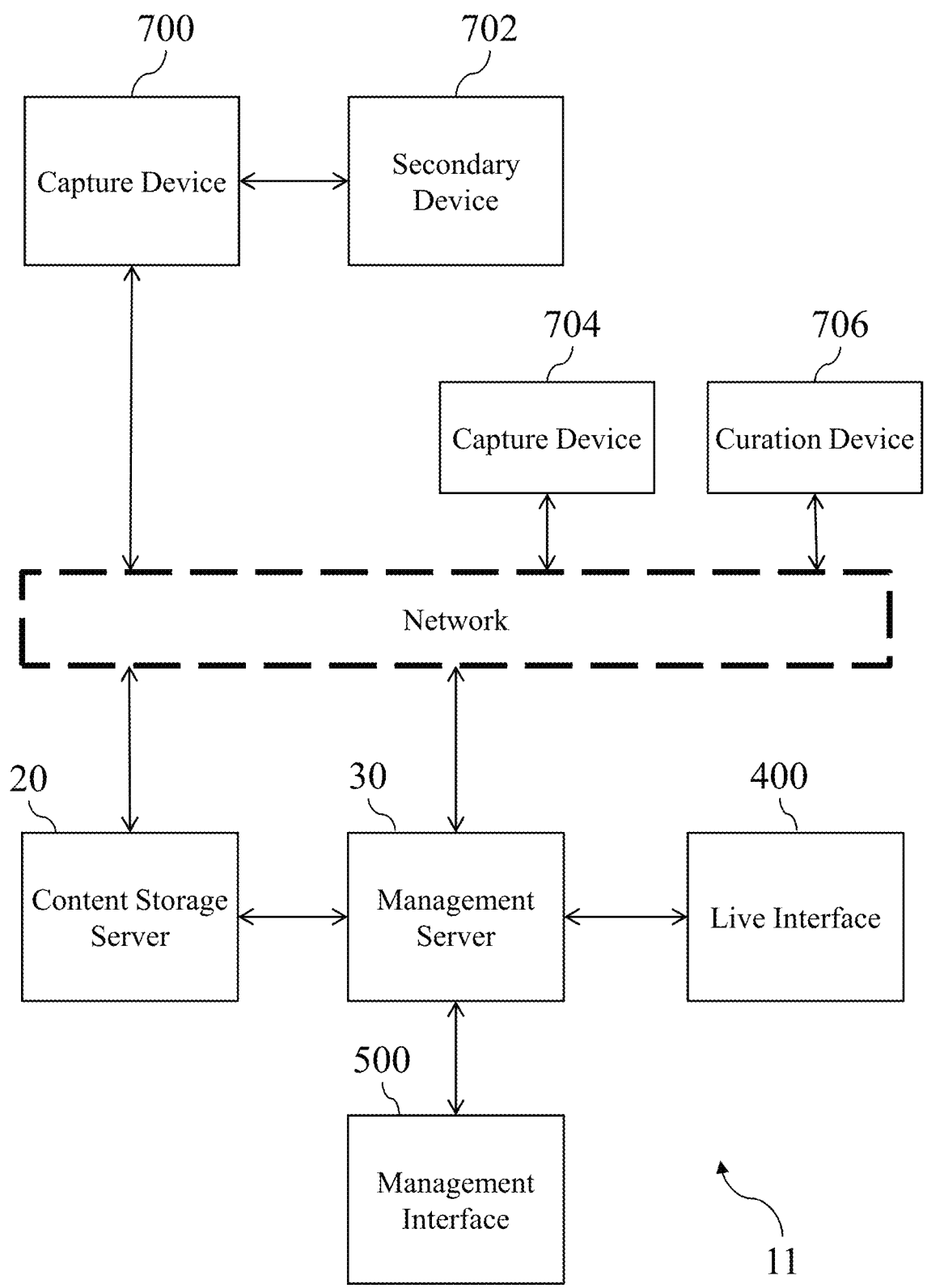
FIG. 19 is a system architecture of an exemplary curation system with multiple curation and capture devices.

While some examples have been provided of multi-device implementations of the curation system (10), others exist. FIG. 19 shows an exemplary curation system (11) that includes multiple curation devices (e.g., capture devices and other curation devices), in addition to other aspects of the curation system (10) including the content storage server (20), the management server (30), the live interface (400), and the management interface (500), as described in the context of FIG. 1. The system (11) also includes a capture device (700) and a second capture device (704), which may be similar to the capture device (100) as described in the context of FIG. 1. A curation device (706) may be a device such as a smartphone or tablet configure with software to allow interaction with the curation system (11) independently from capturing or viewing content (e.g., an application usable to mark specific sections of content), as has been described above.

The capture device (700) is in communication with a secondary device (702) that is operable to interact with the curation system (11) through the capture device (700). As an example, the secondary device (702) may be a camera, microphone, or other device in communication with the capture device (700) (e.g., via Bluetooth, Wi-Fi, USB, or other wired or wireless connection). The secondary device (702) provides additional information to the capture device (700), which then provides the data to the content storage server (20) and/or the management server (30) in order to be associated with a project and content capture session.

As an example, where the secondary device (702) is an additional camera capable of capturing audio and video, the content captured from the secondary device (702) may be used instead of or in addition to content captured from the capture device (700). In this manner, an interview may be captured in video from two different perspectives by separately positioning the capture device (700) and the secondary device (702). These two video streams may be switched between (e.g., a single piece of captured content may be captured from one device or the other) or both saved (e.g., to produce two separate pieces of content).

As one example of the above, the secondary device (702) may be an endoscopic camera, and the capture device (700) may be used to provide training and observation opportunities related to the use of the endoscopic camera. This could include using the capture device (700) to capture video of a trainee performing a simulated medical procedure with the endoscopic camera. During observation, the user of the capture device (700) may switch between the video feed provided by the capture device (700) and the secondary device (702). This may be useful to capture video of the trainee performing external steps of the procedure, while also having the capability of switching and viewing video of the trainee performing internal steps of the procedure on a medical dummy.

As another example, where a person is being interviewed on the use of a certain product, the capture device (700) may be focused on a seat for the interviewee while the secondary device (702) may be a camera that is focused on the product which may be nearby. As the interviewee moves between the seat and the product, the interviewer may be able to switch between the two video feeds so that the content stored on the content storage server (20) is created from the desired feed, instead of containing sections of irrelevant content (e.g., such as an empty chair when the interviewee has stepped away to interact with the product). Switching between the two feeds may be performed manually by interacting with the capture device (700) or another device, or may be triggered automatically based upon detection of motion by one device or the other (e.g., the capture device (700) may be used to capture video when motion is detected within its field of view, while the secondary device (702) may be used to capture video when motion is detected within its field of view).

When switching between feeds, the selected feed may be displayed on the capture device (700), displayed on the live interface (400), and saved to the content storage server (20), while the unselected feeds may be disabled or discarded entirely, or may be saved (e.g., to the content storage server) but not displayed.

As another exemplary use of the curation system (11), the capture device (700) and the capture device (704) may be in the possession of interviewees that are remotely located from an interviewer, who may interact with the system via the management interface (500). The interviewer may operate the management interface (500) to provide messaging and notifications to a plurality of capture devices. Notifications may instruct interviewees to answer provided questions, use products, or perform other tasks related to the interview while capturing their performance or answers with the capture device that is in their possession. Content captured during this multi-device interview may be stored on the content storage server (20) and interacted with using various content control and review features (e.g., the visual timeline, transcription features, etc., as described above).

In some implementations of a multi-device curation system, content from multiple devices could be combined or aggregated in various ways in order to produce a single content stream that combines content from two or more sources. In such a system, content from a single content capture session may be captured by the capture device (700), the secondary device (702), and the capture device (704) simultaneously, meaning that there may be three distinct video perspectives for the same period of time (e.g., a video captured by the capture device (700) from a first perspective, a video captured by the secondary device (702) from a second perspective, etc.). Typically, the three video perspectives will be associated with similar audio content which may vary only in the volume at which speech or other sounds are captured based on the position and distance of the capturing device from the source of sound.

In such a scenario, the capture devices (700, 704), the management server (30), or both may process captured content to isolate a single audio stream that may be shared by the three video perspectives, and may also be associated with a single transcript, as has been described. Thus, while the three different video perspectives show different video content, they may share a single audio stream and transcript that may be used in place of any original audio content when the captured content is reviewed and curated. Additionally, as the video content is captured (e.g., by configuring the capture device (700)) or during later creation, the three separate video perspectives may be enabled, disabled, or combined in order to produce a single video stream containing one or more perspectives. This single video stream may display a single perspective during a time period, or may show multiple perspectives during a time period (e.g., as a split screen video, picture-in-picture video, or other display).

By syncing multiple video perspectives to display video content during the same time period, and then syncing the single audio stream to that aggregate video content, a piece of content may be produced showing one or more synchronized video perspectives along with a unified audio stream and associated transcript. This may be useful to capture, curate, and produce clips that show multiple video perspectives of an interview or other content capture session (e.g., a close up view of the interviewee, a close up view of a product they are interacting with, and a remote view of the entire room in which the interview is taking place), while also minimizing the amount of duplicative audio and transcript content associated with the content capture session.

Audio isolation and video combination may occur locally (e.g., on the capture device (700)) or may occur once content has been transmitted to the content storage server (20) (e.g., by the management server (30)), as will be apparent to those skilled in the art in light of this disclosure. For example, in some implementations the capture device (700) may combine video content from the secondary device (702) with video content captured by the capture device (700) into a split screen or picture in picture video content prior to transmitting to the content storage server (20). As another example, the capture device (700) may be configured to use audio captured from the secondary device (702) as the "master" audio stream for the content capture session, and may disable its own microphone or may discard audio content captured by the capture device (700) prior to transmitting to the content storage server (20).

V. Exemplary Methods for Curation System Network Management

Some features relating to the efficient transfer and storage of curation content have been described, but others exist. One advantage of the disclosed system is to allow multiple users to collaborate during a content capture session (e.g., a local user via the capture device (100) or another device, and other users via the live interface (400)). With conventional systems, connectivity issues may result in users that are collaborating via the live interface (400) being unable to view and interact with content as desired. Connectivity issues may be a result of the capture device (100) having a poor connection to the content storage server (20) and/or management server (30), or may be due to the device (e.g., a computer, a smartphone, a tablet) that is accessing the live interface (400) having a poor connection.

Figure 20:
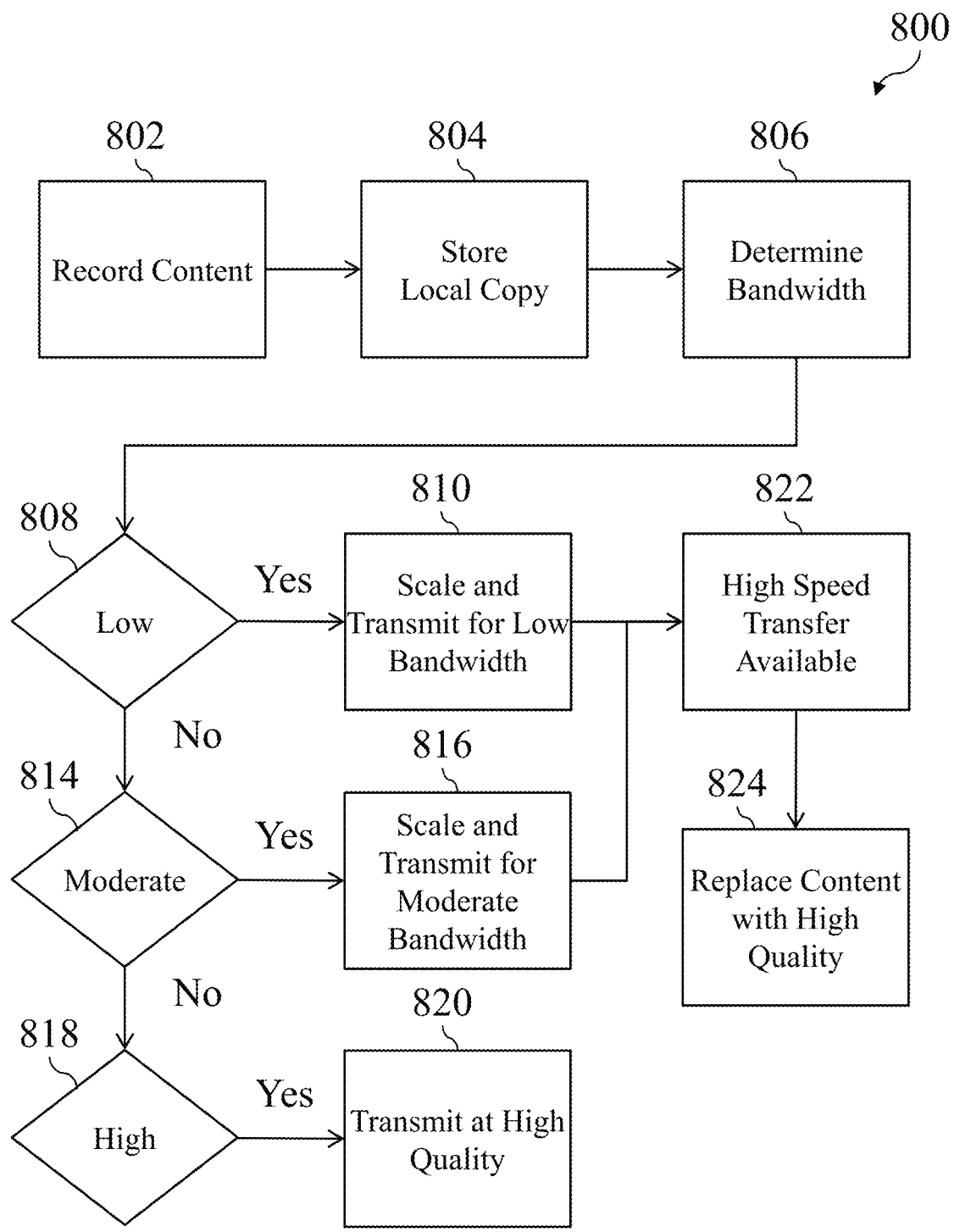
FIG. 20 is a flowchart of an exemplary set of steps that the curation system could perform when capturing content.

Some implementations of the system may be configured to scale and modify the content as it is being transmitted to the content storage server (20) and/or management server (30), as it is being transmitted to the live interface (400), or both. As an example, FIG. 20 shows an exemplary set of steps (800) that may be performed to make content available in real time while also ensuring that high-quality content is preserved. While FIG. 20 describes a scenario where connectivity of the capture device (100) is insufficient, the steps of FIG. 20 may also be applied where connectivity of a device accessing the live interface (400) is insufficiency, as will be understood by one of ordinary skill in the art in light of this disclosure.

As content is recorded (802) by the capture device (100), a local copy may be stored (804) on the capture device (100) at its originally captured quality, or at a configured "high-quality" (e.g., original capture quality may be 4 k, while "high-quality" may be 1080p, as may be desirably configured). This may include converting the content with the processor (104) as it is captured and stored, or as the processor (104) becomes available. In some implementations this may include separating audio and video into separate files from a single source, and may also include capturing still images from video content, for example. These modified derivatives of the original or high-quality content may be stored in addition to the source content from which they are derived.

At various times during a content capture session (e.g., based on a configured schedule, at arbitrary times, or in response to a detected change in connectivity) the capture device (100) may test connectivity to the system to determine (806) the currently available bandwidth or connectivity. Where the connectivity is determined (806) to be high (818), such as where the capture device (100) is connected to a local intranet capable of land-line speed communication over the internet or where the capture device (100) is connected to a high-speed cellular data network at connection speeds that are near maximum, the stored (804) content may be transmitted to the content storage server (20) and/or management server (30) in its high-quality form (e.g., the original capture quality or a moderately downscaled quality such as 1080p, including audio content).

Where connectivity is determined to be moderate (814), such that transmission of the high-quality content may result in choppy audio or video, or complete loss of audio or video, the capture device (100) may instead downscale the content to an appropriate quality based on the available connectivity and transmit (816) a version of the content that is reduced in quality. The capture device (100) may be configured to produce reduced quality content that is capable of transmitting over moderate connectivity in various ways, including by reducing image resolution, reducing sound quality, reducing image framerates, and other modifications, and may be configured to make such modifications based on the detected bandwidth (e.g., a high-moderate bandwidth may result in only reduced image quality, while a low-moderate bandwidth may result in reduced image and audio quality) in order to not exceed the current connectivity. The capture device (100) may make such modifications automatically, or may be manually configured to make such modifications based on a user preference (e.g., some users may require high-quality audio at all times, even at the cost of poor image quality).

In this manner, when connectivity during a content capture session varies the capture device (100) may seamlessly switch from transmitting high-quality content to the content storage server (20) to transmitting downscaled content that is appropriate for moderate connectivity. In doing so, a user viewing the content via the live interface (400) may continue to do so uninterrupted, even where the image quality or framerate may be reduced, rather than losing the ability to view the content entirely.

As can be seen, the same or similar quality scaling process can be applied by the content storage server (20) and/or management server (30) where the live interface (400) has moderate or varied connectivity, such that high-quality content that is stored on the content storage server (20) may be downscaled when transmitted to the live interface (400).

Where connectivity is determined to be low (808), such that transmission of high-quality or even modified or downscaled moderate quality content may be difficult without the content being choppy, delayed, or entirely unavailable, the capture device (100) may be configured to modify and transmit the content in a form that is adapted for low connectivity. This may include transmitting still images captured from the content at configurable intervals (e.g., every 10 seconds) and using various image compression processes (e.g., JPEG) along with isolated audio content. The viewable result available to the live interface (400) may appear to be content with an extremely low frame rate, but still having acceptable audio quality. In this manner, a remote collaborator may participate in content curation as it is captured by focusing primarily on the audio portion of the content despite the low connectivity of the capture device (100).

For extremely low connectivity, transmitted content may be further reduced in image quality or may disable transmission of images or video entirely while continuing to transmit audio of moderate or low-quality, as may be determined based upon the available connectivity and bandwidth. In some implementations, the capture device (100) may be configured to automatically generate transcript text based upon audio content locally, which may be transmitted in various low connectivity scenarios in addition to or instead of images and audio (e.g., at a lowest connectivity only automatically generated transcript text may be transmitted to the live interface (400)).

As connectivity changes, whether by improving or degrading, the capture device (100) may be configured to automatically adapt the quality and composition of transmitted content. For example, where audio only content is being transmitted due to low connectivity, a detected high-quality connection may result in the capture device (100) switching back to transmitting the content in high-quality.

While maintaining access to content for users of the live interface (400) that are collaborating during a content capture session has been discussed, another advantage of such an implementation is the retention and availability of a local original or high-quality copy. By saving this version of content on the capture device (100), downscaled content can later be replaced by improved quality content when a high-speed transfer is available (822) to the capture device. This may include attaching the capture device (100) to a wired internet connection (e.g., USB via a computer or other device communicating with the internet over land lines), attaching the capture device (100) to a high-speed internet connection over a local Wi-Fi connection, and other scenarios. When a high-speed transfer is available (822), the capture device may be configured to transmit the high-quality content to the content storage server (20) where it may replace (824) the content as originally transmitted. Replacement (824) may occur automatically as a result of factors such as connectivity between devices, network traffic, processor availability, and other factors, or may occur manually as a result of a user selecting content or content clips to be replaced (824).

As has been described above, content may also be downscaled before and as it is transmitted to the live interface (400) or other interfaces for viewing and curation, even where the high-quality content is already present and available on the content storage server (20). For example, where a user of the live interface (400) is viewing a content capture session in real-time but has an inadequate connection to the internet, the content may be provided to that particular user in audio only form while not impacting the experience of other users of the live interface (400), who may continue to view the content in high-quality form. In addition to automatically adjusting the transmission of content, some user interfaces may also support manual configurations to cause content to be transmitted in a particular quality or format (e.g., audio only) as may be desirable configured by a particular user (e.g., such as where a user is driving and only wishes to listen to a content audio) or project administrator (e.g., a project administrator may cause some users to receive only content images, while another user may receive only content audio, when viewing via the live interface (400)).

For example, where content is originally transmitted in audio-only form, or in a reduced resolution or framerate video form, the high-quality content may provide improved audio or video for those reviewing content and so may be preferable to the moderate or low-quality content. In addition to replacing the original content with the high-quality version, the system may be configured to modify the high-quality content to include any comments, tags, or other changes made by collaborating reviewers to the original content. For example, where audio only content is converted into one or more sub-content clip, or where comments, tags, or keywords are associated with particular portions of the content or clips, such metadata and modifications (e.g., newly created clips, associated tags and text) may be mirrored to the high-quality version such that the initial review and curation of the content is preserved. This may include creating sub-content clips from the high-quality content and replacing audio only clips as well as mirroring tags and comments to the high-quality version. When content is replaced (824) in this manner, users of the live interface (400) or other interfaces of the system that are reviewing the originally transmitted version of content may receive a notification indicating that the content has been upgraded to high-quality, or may have their interface automatically refreshed to begin viewing the newly available high quality content.

In addition to the content quality management features described above, some implementations of the system may also display the visual timeline and other aspects of the navigation pane (660) and other interfaces to reflect the quality of content and content clips that is presently available. For example, where a two-hour piece of content has several sections that are available for viewing at high-quality, those portions of content along the visual timeline may be highlighted green or otherwise visually demarcated as being a section of high-quality content. Sections of content that were transmitted with moderate connectivity may be highlighted yellow to indicate that it has been visually downscaled, while content transmitted with low connectivity may be highlighted red to indicate that it is audio only content. Content quality may be determined and displayed on the visual timeline in this manner based upon data records indicating the quality at which the content was transmitted, may be based upon analysis of the content to determine its resolution, framerate, and other quality indicators, or may be based upon other factors.

Such a visual timeline may also include buttons or other interface elements that allow a user to replace reduced quality content with high-quality content where it is available. For example, where the capture device (100) still has access to high-quality versions of the content and is communicatively coupled to the management server (30), a user may interact with the visual timeline (e.g., clicking on red highlighted section) to cause the high-quality content to be retrieved from the capture device (100) on demand.

Another example of a feature that may be implemented with the curation system (10) relates to the management of content (e.g., an originally captured piece of audio video) and content clips (e.g., a piece of sub-content captured from content as a clip). When users are curating content via an interface such as the navigation pane (660), they initially may be viewing the piece content as it was originally captured during a content capture session and transmitted to the content storage server (20). For example, where a particular content capture session is two hours long, the collaborating users may be viewing and receiving data associated with the entire two-hour long piece of content. When a user selects a portion of sub-content to be captured as a clip, the interface may be updated to reflect that they are viewing or curating the shorter clip, even where that shorter clip has not yet been produced and saved to the content storage server (20). In other words, by using metadata associated with the clip (e.g., the start time and end time of the clip within the content) and the original content, the availability of the clip may be simulated by only presenting the associated portion of the content and excluding the remainder.

Newly created clips may be rendered and processed in the background by the system, and may be stored to the content storage server (20) when they are complete. At this time, the system may begin presenting the actual clip to the user rather than the simulated clip, and may also mirror any comments, tags, keywords, or other data that curators have added to the simulated clip to the newly created clip so that no curation work is lost. By creating and storing clips as discrete files or datasets, the system may utilize network and storage resources more efficiently. For example, where a user is curating a simulated clip (e.g., shortly after the original content was captured, or during the content captures session) they are able to curate in real time, though in some cases network traffic for that user may be higher as compared to curating a clip (e.g., original content may be several gigabytes in size, while a clip may be less than a hundred megabytes). After the clip is created and available, transmission of the clip to the user instead during curation and review instead of the original content may reduce network traffic. Similarly, downloading and sharing clips as discrete files rather than as the original content may also reduce network traffic.

Data retention policies for the content storage server (20) may also take advantage of the separate maintenance of content and clips in order to more efficiently store data. For example, in some implementations of the curation system (10) the original content may be removed from storage after a period of six months, while clips created from that content may be stored for twenty four months.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system comprising:
   (a) a server comprising a processor and a memory;
   (b) a capture device comprising a camera and a microphone operable to capture video and audio content, and wherein the capture device is communicatively coupled with the server;
   wherein the processor of the server is configured to:
   (i) receive a set of content and a set of project data from the capture device during a content capture session, wherein the set of content is continuous audio and video content captured during an uninterrupted period of time during the content capture session;
   (ii) associate the set of content with a project based on the set of project data;
   (iii) provide a set of interface data to a user device that is associated with the project as a content curator, wherein the set of interface data is configured to cause the user device to display a collaboration interface;
   (iv) cause the collaboration interface to present the set of content;
   (v) receive a set of user input from the user device and, based on the set of user input:
      (A) create a clip from the set of content, wherein the clip is a subset of the set of content during a period of time within the uninterrupted period of time; and
      (B) associate a marker with the set of content at a moment in time; and
   (vi) update the set of interface data to describe the clip and the marker and provide the set of interface data to a plurality of user devices that are associated with the project as content curators to cause the collaboration interface to display on the plurality of user devices, including descriptions of the clip and the marker.

2. The system of claim 1, wherein the processor is further configured to:
   (i) receive a set of transcription data and associate the set of transcription data with the set of content so that the text of the set of transcription data corresponds to audio in the set of content; and
   (ii) present the set of transcription data in a transcript pane via the collaboration interface when the set of content or any clip is presented.

3. The system of claim 2, wherein the processor is further configured to:
   (i) receive a transcript selection from the user device indicating that one or more words in the transcript pane have been selected;
   (ii) identify a portion of the set of content comprising spoken audio that corresponds to the selected one or more words; and
   (iii) create the clip from the set of content based on the identified portion.

4. The system of claim 2, wherein the processor is further configured to:
   (i) receive a transcript search phrase from the user device;
   (ii) identify a set of matches within the set of transcription data based on the transcript search phrase, wherein the set of matches comprise text;
   (iii) identify a plurality of portions of the set of content comprising spoken audio that correspond to text of the set of matches; and
   create a plurality of clips from the set of content wherein each of the plurality of clips:
      (A) includes an identified portion of the plurality of portions,
      (B) comprises an immediately preceding portion of a length between about 5 and about 10 seconds prior to the identified portion, and an immediately subsequent portion of a length between about 5 and about 10 seconds following the identified portion.

5. The system of claim 4, wherein the processor is further configured to:
   (i) cause the collaboration interface to display a transcript word cloud, wherein the transcript word cloud indicates the number of occurrences of each of a plurality of words within the set of transcription data; and
   (ii) receive the transcript search phrase in response to a word of the transcript word cloud being selected.

6. The system of claim 1, wherein the processor is further configured to present a visual timeline via the collaboration interface, wherein the visual timeline is associated with the set of content and comprises:
   (i) a timeline indicating the overall length of the set of content;
   (ii) one or more clip blocks indicating periods of time from which a plurality of clips, including the clip, have been created from the set of content; and
   (iii) one or more timeline markers indicating moments in time at which a plurality of markers, including the marker, have been associated with the set of content.

7. The system of claim 6, wherein the processor is further configured to:
   (i) associate the marker with a text comment based on the set of user input; and
   (ii) associate the marker with a curating user that is associated with the user device from which the set of user input is received; and
   (iii) cause each of the one or more timeline markers to appear visually distinct based upon an associated curating user that added that timeline marker;
   wherein the displayed collaboration interface includes visually distinct timeline markers added by at least two different curating users.

8. The system of claim 6, wherein the processor is further configured to:
   (i) cause the visual timeline to include a set of marking controls operable to add a timeline marker to the set of content having a preconfigured visual appearance;
   (ii) receive a marker selection from the user device indicating that a marking control was selected;
   (iii) determine the preconfigured visual appearance of the timeline marker based on the marker selection; and
   (iv) present the timeline marker on the visual timeline based on the preconfigured visual appearance.

9. The system of claim 8, wherein the processor is further configured to receive a set of configuration data from the user device indicating preconfigured visual appearances for one or more of the set of marking controls, wherein the preconfigured visual appearances comprise one or more of:
   (i) a shape of the timeline marker;
   (ii) a color of the timeline marker; and
   (iii) a pattern of the timeline marker.

10. The system of claim 1, further comprising a secondary camera that is communicatively coupled to the capture device, wherein the capture device is configured to:
   (i) determine an active camera from the camera and the secondary camera;
   (ii) provide content captured by the active camera as the set of content; and (iii) prevent content from an inactive camera being provided as the set of content;
wherein the set of content is comprised of continuous audio and video content from both the camera and the secondary camera during the uninterrupted period of time.

11. The system of claim 10, wherein the secondary camera is communicatively coupled to the capture device via a wireless connection, and wherein the capture device is further configured to configure the secondary camera as the active camera in response to a user input, and in response to a signal from the secondary camera indicating detection of motion.

12. The system of claim 1, wherein the capture device is configured to:
  (i) capture a set of local content at a preconfigured high-quality setting;
  (ii) store the set of local content on a storage device of the capture device;
  (iii) determine a connection speed at which the capture device is currently communicating with the server;
  (iv) create the set of content, at a lower quality setting than the high-quality setting, from the set of local content based on the connection speed and provide the set of content to the server; and
  (v) provide the set of local content to the server in response to a signal indicating that the set of content should be replaced with the set of local content; and
wherein the processor of the server is configured to:
  (A) receive the set of local content from the capture device;
  (B) in response to receiving the set of local content at the pre-configured high quality setting from the capture device, discard the set of content at the lower quality setting; and
  (C) replace the discarded set of content with the received set of local content.

13. The system of claim 12, wherein the capture device is configured to, in response to determining the connection speed as a moderate speed, create the set of content from the set of local content by reducing one or more of:
  (i) image quality of the set of local content; and
  (ii) framerate of the set of local content.

14. The system of claim 12, wherein the capture device is configured to, in response to determining the connection speed as a low speed, create the set of content from the set of local content by:
  (i) providing only audio content from the set of local content; or
  (ii) providing only audio content and still image files from the set of local content.

15. A method comprising:
  (a) using a capture device to capture video and audio content during a content capture session;
  (b) receiving a set of content and a set of project data from the capture device at a server during a content capture session, wherein the set of content is continuous audio and video content captured during an uninterrupted period of time during the content capture session;
  (c) associating the set of content with a project based on the set of project data;
  (d) displaying a collaboration interface on a user device that is associated with the project as a content curator;
  (e) displaying the set of content to the user device via the collaboration interface;
  (f) receiving a set of user input from the user device and, based on the set of user input:
    (i) creating a clip from the set of content, wherein the clip is a subset of the set of content during a period of time within the uninterrupted period of time; and
    (ii) associating a marker with the set of content at a moment in time; and
  (g) updating the collaboration interface to describe the clip and the marker and displaying the updated collaboration interface to a plurality of user devices that are associated with the project as content curators to cause the collaboration interface to display on the plurality of user devices, including descriptions of the clip and the marker.

16. The method of claim 15, further comprising:
  (a) with the capture device, capturing a set of local content at a preconfigured high-quality setting;
  (b) storing the set of local content on a storage device of the capture device;
  (c) determining a connection speed at which the capture device is currently communicating with the server;
  (d) creating the set of content, at a lower quality setting than the high quality setting, from the set of local content based on the connection speed and provide the set of content to the server; and
  (e) providing the set of local content to the server in response to a signal indicating that the set of content should be replaced with the set of local content; and
  (f) at the server and in response to receiving the set of local content at the pre-configured high quality setting, discarding the set of content at the lower quality setting and replacing the set of content with the set of local content.

17. The method of claim 16, further comprising:
  (a) in response to determining that the connection speed is a moderate speed, creating the set of content from the set of local content by reducing image quality of video content while maintaining quality of audio content; and
  (b) in response to determining that the connection speed is a low speed, creating the set of content from the set of local content by providing only audio content.

18. The method of claim 15, further comprising:
  (a) at the server, receiving and associating a set of transcription data with the set of content so that the text of the transcription data corresponds to audio in the set of content;
  (b) presenting the set of transcription data in a transcript pane via the collaboration interface when the set of content or any clip is presented;
  (c) receiving a transcription selection from the user device indicating that one or more words in the transcript pane have been selected; and
  (d) creating the clip from the set of content based on the transcript selection, wherein the period of time in the set of content comprises audio of the selected one or more words.

19. The method of claim 15, further comprising:
  (a) displaying a visual timeline on the user device via the collaboration interface, wherein the visual timeline comprises:
    (i) a timeline indicating the overall length of the set of content;
    (ii) one or more clip blocks indicating periods of time from which a plurality of clips, including the clip, have been created from the set of content; and
    (iii) one or more timeline markers indicating moments in time at which a plurality of markers, including the marker, have been associated with the set of content; and (b) associating each of the one or more timeline markers with one or more curating users that added the timeline markers; and (c) displaying each of the one or more timeline markers as visually distinct based upon an associated curating user, wherein the displayed collaboration interface includes visually distinct timeline markers added by at least two different curating users.

20. A system comprising:

(a) a server comprising a processor and a memory;

(b) a capture device comprising a camera and a microphone operable to capture video and audio content, and wherein the capture device is communicatively coupled with the server;

wherein the processor of the server is configured to:

(i) receive a set of content and a set of project data from the capture device during a content capture session, wherein the set of content is continuous audio and video content captured during an uninterrupted period of time during the content capture session;

(ii) associate the set of content with a project based on the set of project data;

(iii) provide a set of interface data to a user device that is associated with the project as a content curator, wherein the set of interface data is configured to cause the user device to display a collaboration interface, the collaboration interface comprising a visual timeline that comprises:

(A) a timeline indicating the overall length of the set of content;

(B) one or more clip blocks indicating periods of time from which a plurality of clips, including the clip, have been created from the set of content; and (C) one or more timeline markers indicating moments in time at which a plurality of markers, including the marker, have been associated with the set of content, wherein each of the one or more timeline markers are associated with a curating user that added that timeline marker, and wherein each of the one or more timeline markers appear visually distinct based upon an associated curating user, wherein the displayed collaboration interface includes visually distinct timeline markers added by at least two different curating users;

(iv) cause the collaboration interface to present the set of content;

(v) receive a set of user input from the user device and, based on the set of user input:

(A) create a clip from the set of content, wherein the clip is a subset of the set of content during a period of time within the uninterrupted period of time; and (B) associate a marker with the set of content at a moment in time; and (vi) update the set of interface data to describe the clip and the marker and provide the set of interface data to a plurality of user devices that are associated with the project as content curators to cause the collaboration interface to display on the plurality of user devices, including descriptions of the clip and the marker.

* * * * *